US009584360B2

(12) United States Patent
Joshi

(10) Patent No.: US 9,584,360 B2
(45) Date of Patent: Feb. 28, 2017

(54) GLOBAL SERVER LOAD BALANCING SUPPORT FOR PRIVATE VIP ADDRESSES

(75) Inventor: Prajakta S. Joshi, Santa Clara, CA (US)

(73) Assignee: FOUNDRY NETWORKS, LLC, San Jose, CA (US)

( * ) Notice: Subject to any disclaimer, the term of this patent is extended or adjusted under 35 U.S.C. 154(b) by 1123 days.

(21) Appl. No.: 10/674,627

(22) Filed: Sep. 29, 2003

(65) Prior Publication Data

US 2010/0095008 A1    Apr. 15, 2010

(51) Int. Cl.
  G06F 9/46      (2006.01)
  H04L 29/12     (2006.01)
  H04L 29/08     (2006.01)

(52) U.S. Cl.
  CPC .. H04L 29/12066 (2013.01); H04L 29/12367 (2013.01); H04L 61/1511 (2013.01); H04L 61/2514 (2013.01); H04L 67/1002 (2013.01)

(58) Field of Classification Search
  CPC ......... H04L 61/20; H04L 61/25; H04L 61/29; H04L 63/00; H04L 29/12066; H04L 29/12367; H04L 61/1511; H04L 61/2514; H04L 67/1002
  USPC .................. 717/171–173, 176–177; 718/105
  See application file for complete search history.

(56) References Cited

U.S. PATENT DOCUMENTS

| 5,031,094 | A | 7/1991 | Toegel et al. ................. 364/200 |
| 5,359,593 | A | 10/1994 | Derby et al. ..................... 370/17 |
| 5,530,872 | A | 6/1996 | Smeltzer et al. |
| 5,539,883 | A | 7/1996 | Allon et al. |
| 5,867,706 | A | 2/1999 | Martin et al. |
| 5,918,017 | A | 6/1999 | Attanasio et al. |
| 5,948,061 | A | 9/1999 | Merriman et al. ............ 709/219 |
| 5,951,634 | A | 9/1999 | Sitbon et al. ................ 709/105 |
| 6,006,269 | A | 12/1999 | Phaal |

(Continued)

FOREIGN PATENT DOCUMENTS

| EP | 1128613 | 8/2001 |
| WO | 01/039003 | 5/2001 |
| WO | 01/093530 | 12/2001 |

OTHER PUBLICATIONS

Foundry Networks, "Server Load Balancing in Today's Web-enabled Enterprises", White Paper, pp. 1-10, Apr. 2002.*

(Continued)

*Primary Examiner* — Ted T Vo
(74) *Attorney, Agent, or Firm* — Polsinelli PC

(57) ABSTRACT

A site switch determines the mapping between public and private IP addresses of VIPs configured on the site switch. The site switch then transmits the public IP address, rather than the private IP address, to a load balancing switch that performs the load balancing for network resources accessible via the site switch. This public IP address has also been configured on an authoritative DNS server for which the load balancing switch serves as a proxy. The load balancing switch updates its address records, containing the VIPs configured on the site switch, with the public address of the VIP. When the load balancing switch reorders a DNS reply from the authoritative DNS server for a domain containing the public address, the load balancing switch correctly identifies the IP address as a VIP on the site switch and applies appropriate load balancing metrics to the received IP address.

18 Claims, 7 Drawing Sheets

(56) References Cited

U.S. PATENT DOCUMENTS

| | | | |
|---|---|---|---|
| 6,006,333 A | 12/1999 | Nielsen | |
| 6,012,088 A | 1/2000 | Li et al. | |
| 6,078,956 A | 6/2000 | Bryant et al. | |
| 6,092,178 A | 7/2000 | Jindal et al. | 712/27 |
| 6,112,239 A | 8/2000 | Kenner et al. | 709/224 |
| 6,115,752 A | 9/2000 | Chauhan | 709/241 |
| 6,119,143 A | 9/2000 | Dias et al. | |
| 6,128,279 A | 10/2000 | O'Neil et al. | 370/229 |
| 6,128,642 A | 10/2000 | Doraswamy et al. | 709/201 |
| 6,134,588 A | 10/2000 | Guenthner et al. | |
| 6,148,410 A | 11/2000 | Baskey et al. | |
| 6,157,649 A | 12/2000 | Peirce et al. | |
| 6,167,445 A | 12/2000 | Gai et al. | |
| 6,167,446 A | 12/2000 | Lister et al. | 709/223 |
| 6,178,160 B1 | 1/2001 | Bolton et al. | |
| 6,182,139 B1 | 1/2001 | Brendel | 709/226 |
| 6,185,619 B1 | 2/2001 | Joffe et al. | |
| 6,195,691 B1 | 2/2001 | Brown | |
| 6,205,477 B1 | 3/2001 | Johnson et al. | |
| 6,233,604 B1 | 5/2001 | Van Horne et al. | 709/203 |
| 6,249,801 B1* | 6/2001 | Zisapel et al. | 718/105 |
| 6,256,671 B1 | 7/2001 | Strentzsch et al. | |
| 6,260,070 B1 | 7/2001 | Shah | |
| 6,262,976 B1 | 7/2001 | McNamara | |
| 6,286,039 B1 | 9/2001 | Van Horne et al. | 709/221 |
| 6,286,047 B1 | 9/2001 | Ramanathan et al. | 709/224 |
| 6,304,913 B1 | 10/2001 | Rune | |
| 6,317,775 B1 | 11/2001 | Coile et al. | |
| 6,324,177 B1 | 11/2001 | Howes et al. | |
| 6,324,580 B1 | 11/2001 | Jindal et al. | 709/228 |
| 6,327,622 B1 | 12/2001 | Jindal et al. | |
| 6,330,605 B1 | 12/2001 | Christensen et al. | |
| 6,336,137 B1 | 1/2002 | Lee et al. | |
| 6,378,068 B1 | 4/2002 | Foster et al. | |
| 6,381,627 B1 | 4/2002 | Kwan et al. | 709/201 |
| 6,389,462 B1 | 5/2002 | Cohen et al. | 709/218 |
| 6,393,473 B1 | 5/2002 | Chu | |
| 6,405,252 B1 | 6/2002 | Gupta et al. | |
| 6,411,998 B1 | 6/2002 | Bryant et al. | |
| 6,427,170 B1 | 7/2002 | Sitaraman et al. | 709/226 |
| 6,434,118 B1 | 8/2002 | Kirschenbaum | |
| 6,438,652 B1 | 8/2002 | Jordan et al. | 711/120 |
| 6,446,121 B1 | 9/2002 | Shah et al. | |
| 6,449,657 B2 | 9/2002 | Stanbach, Jr. et al. | 709/245 |
| 6,470,389 B1 | 10/2002 | Chung et al. | 709/227 |
| 6,473,802 B2 | 10/2002 | Masters | |
| 6,480,508 B1 | 11/2002 | Mwikalo et al. | 370/475 |
| 6,487,555 B1 | 11/2002 | Bharat et al. | |
| 6,490,624 B1 | 12/2002 | Sampson et al. | |
| 6,513,061 B1 | 1/2003 | Ebata et al. | |
| 6,542,964 B1 | 4/2003 | Scharber | |
| 6,549,944 B1 | 4/2003 | Weinberg et al. | 709/224 |
| 6,578,066 B1 | 6/2003 | Logan et al. | |
| 6,578,077 B1 | 6/2003 | Rakoshitz et al. | |
| 6,601,084 B1 | 7/2003 | Bhaskaran et al. | |
| 6,606,643 B1 | 8/2003 | Emens et al. | 709/203 |
| 6,611,861 B1 | 8/2003 | Schairer et al. | |
| 6,647,009 B1 | 11/2003 | Kubota et al. | |
| 6,665,702 B1* | 12/2003 | Zisapel et al. | 718/105 |
| 6,681,232 B1 | 1/2004 | Sistanizadeh et al. | 707/104.1 |
| 6,681,323 B1 | 1/2004 | Fontanesi et al. | 713/1 |
| 6,684,250 B2 | 1/2004 | Anderson et al. | |
| 6,691,165 B1 | 2/2004 | Bruck et al. | |
| 6,701,368 B1 | 3/2004 | Chennapragada et al. | |
| 6,718,387 B1 | 4/2004 | Gupta et al. | |
| 6,725,253 B1 | 4/2004 | Okano et al. | |
| 6,745,241 B1 | 6/2004 | French et al. | 709/221 |
| 6,748,416 B2 | 6/2004 | Carpenter et al. | |
| 6,754,699 B2 | 6/2004 | Swildens et al. | |
| 6,754,706 B1 | 6/2004 | Swildens et al. | |
| 6,760,775 B1 | 7/2004 | Anerousis | |
| 6,772,211 B2 | 8/2004 | Lu et al. | |
| 6,775,230 B1 | 8/2004 | Watanabe et al. | |
| 6,779,017 B1 | 8/2004 | Lamberton et al. | |
| 6,785,704 B1 | 8/2004 | McCanne | |
| 6,789,125 B1 | 9/2004 | Aviani et al. | 709/238 |
| 6,795,434 B1 | 9/2004 | Kumar et al. | |
| 6,795,858 B1 | 9/2004 | Jain et al. | |
| 6,795,860 B1 | 9/2004 | Shah | |
| 6,801,949 B1 | 10/2004 | Bruck et al. | |
| 6,810,411 B1 | 10/2004 | Coughlin et al. | |
| 6,826,198 B2 | 11/2004 | Turina et al. | 370/467 |
| 6,839,700 B2 | 1/2005 | Doyle et al. | |
| 6,850,984 B1 | 2/2005 | Kalkunte et al. | 709/229 |
| 6,862,627 B1 | 3/2005 | Cheshire | |
| 6,874,152 B2 | 3/2005 | Vermeire et al. | |
| 6,879,995 B1 | 4/2005 | Chinta et al. | 709/204 |
| 6,880,000 B1 | 4/2005 | Tominaga et al. | |
| 6,883,028 B1 | 4/2005 | Johnson et al. | |
| 6,898,633 B1 | 5/2005 | Lyndersay et al. | 709/226 |
| 6,901,081 B1 | 5/2005 | Ludwig | |
| 6,920,498 B1 | 7/2005 | Gourlay et al. | |
| 6,928,485 B1 | 8/2005 | Krishnamurthy et al. | |
| 6,934,292 B1 | 8/2005 | Ammitzboell | |
| 6,950,848 B1 | 9/2005 | Yousefi'zadeh | |
| 6,963,914 B1 | 11/2005 | Breitbart et al. | 709/226 |
| 6,963,917 B1 | 11/2005 | Callis et al. | 709/227 |
| 6,968,389 B1 | 11/2005 | Menditto et al. | |
| 6,985,956 B2 | 1/2006 | Luke et al. | |
| 6,987,763 B2 | 1/2006 | Rochberger et al. | 370/389 |
| 6,996,615 B1 | 2/2006 | McGuire | 709/226 |
| 6,996,616 B1 | 2/2006 | Leighton et al. | |
| 7,000,007 B1 | 2/2006 | Valenti | 709/219 |
| 7,020,698 B2 | 3/2006 | Andrews et al. | 709/223 |
| 7,020,714 B2 | 3/2006 | Kalyanaraman et al. | |
| 7,028,083 B2 | 4/2006 | Levine et al. | |
| 7,032,010 B1 | 4/2006 | Swildens et al. | 709/219 |
| 7,032,031 B2 | 4/2006 | Jungck et al. | |
| 7,036,039 B2 | 4/2006 | Holland | |
| 7,042,876 B1 | 5/2006 | Jayasenan et al. | |
| 7,047,300 B1 | 5/2006 | Oehrke et al. | |
| 7,058,706 B1 | 6/2006 | Iyer et al. | |
| 7,058,717 B2 | 6/2006 | Chao et al. | |
| 7,062,562 B1 | 6/2006 | Baker et al. | |
| 7,062,642 B1 | 6/2006 | Langrind et al. | |
| 7,080,138 B1 | 7/2006 | Baker et al. | |
| 7,082,102 B1 | 7/2006 | Wright | |
| 7,086,061 B1 | 8/2006 | Joshi et al. | |
| 7,089,293 B2 | 8/2006 | Grosner et al. | |
| 7,099,915 B1 | 8/2006 | Tenereillo et al. | |
| 7,114,008 B2 | 9/2006 | Jungck et al. | |
| 7,117,269 B2 | 10/2006 | Lu et al. | |
| 7,117,530 B1 | 10/2006 | Lin | |
| 7,124,188 B2 | 10/2006 | Mangipudi et al. | |
| 7,127,713 B2 | 10/2006 | Davis et al. | |
| 7,136,932 B1 | 11/2006 | Schneider | |
| 7,139,242 B2 | 11/2006 | Bays | |
| 7,177,933 B2 | 2/2007 | Foth | |
| 7,185,052 B2 | 2/2007 | Day | |
| 7,194,553 B2 | 3/2007 | Lucco et al. | |
| 7,197,547 B1 | 3/2007 | Miller et al. | |
| 7,206,806 B2 | 4/2007 | Pineau | |
| 7,213,068 B1 | 5/2007 | Kohli et a | |
| 7,225,236 B1 | 5/2007 | Puthiyandyil et al. | |
| 7,225,272 B2 | 5/2007 | Kelley et al. | |
| 7,240,015 B1 | 7/2007 | Karmouch et al. | |
| 7,240,100 B1 | 7/2007 | Wein et al. | |
| 7,254,626 B1 | 8/2007 | Kommula et al. | |
| 7,257,642 B1 | 8/2007 | Bridger et al. | |
| 7,260,645 B2 | 8/2007 | Bays | |
| 7,277,954 B1 | 10/2007 | Stewart et al. | |
| 7,289,519 B1 | 10/2007 | Liskov | |
| 7,296,088 B1 | 11/2007 | Padmanabhan et al. | |
| 7,321,926 B1 | 1/2008 | Zhang et al. | |
| 7,330,908 B2 | 2/2008 | Jungck | |
| 7,383,288 B2 | 6/2008 | Miloushev et al. | |
| 7,423,977 B1 | 9/2008 | Joshi et al. | |
| 7,441,045 B2 | 10/2008 | Skene et al. | |
| 7,447,739 B1 | 11/2008 | Cunetto et al. | |
| 7,454,500 B1 | 11/2008 | Hsu et al. | |
| 7,478,148 B2 | 1/2009 | Neerdaels | |
| 7,496,651 B1 | 2/2009 | Joshi | |
| 7,523,181 B2 | 4/2009 | Swildens et al. | |
| 7,573,886 B1 | 8/2009 | Ono | |

(56) References Cited

U.S. PATENT DOCUMENTS

| | | |
|---|---|---|
| 7,574,508 B1 | 8/2009 | Kommula |
| 7,581,006 B1 | 8/2009 | Lara et al. |
| 7,581,009 B1 | 8/2009 | Hsu et al. |
| 7,584,262 B1 | 9/2009 | Wang et al. |
| 7,584,301 B1 | 9/2009 | Joshi |
| 7,594,262 B2 | 9/2009 | Hanzlik et al. |
| 7,653,700 B1 | 1/2010 | Bahl et al. |
| 7,657,629 B1 | 2/2010 | Kommula |
| 7,676,576 B1 | 3/2010 | Kommula |
| 7,734,683 B1 | 6/2010 | Bergenwall et al. |
| 7,756,965 B2 | 7/2010 | Joshi |
| 7,792,113 B1 | 9/2010 | Foschiano et al. |
| 7,840,678 B2 | 11/2010 | Joshi |
| 7,860,964 B2 | 12/2010 | Brady et al. |
| 7,885,188 B2 | 2/2011 | Joshi |
| 7,886,023 B1 | 2/2011 | Johnson |
| 7,899,899 B2 | 3/2011 | Joshi |
| 7,899,911 B2 | 3/2011 | Jensen et al. |
| 7,925,713 B1 | 4/2011 | Day et al. |
| 7,949,757 B2 | 5/2011 | Joshi |
| 8,024,441 B2 | 9/2011 | Kommula et al. |
| 8,527,639 B1 | 9/2013 | Liskov et al. |
| 2001/0049741 A1 | 12/2001 | Skene et al. |
| 2001/0052016 A1 | 12/2001 | Skene et al. |
| 2002/0026551 A1 | 2/2002 | Kamimaki et al. ............ 710/260 |
| 2002/0038360 A1 | 3/2002 | Andrews et al. ............ 709/223 |
| 2002/0049778 A1 | 4/2002 | Bell et al. |
| 2002/0055939 A1 | 5/2002 | Nardone et al. |
| 2002/0059170 A1 | 5/2002 | Vange |
| 2002/0059464 A1 | 5/2002 | Hata et al. |
| 2002/0062372 A1 | 5/2002 | Hong et al. ................... 709/225 |
| 2002/0078233 A1 | 6/2002 | Biliris et al. |
| 2002/0087722 A1 | 7/2002 | Datta et al. |
| 2002/0091840 A1 | 7/2002 | Pulier et al. .................. 709/228 |
| 2002/0107841 A1 | 8/2002 | Hellerstein et al. |
| 2002/0112036 A1 | 8/2002 | Bohannon et al. ........... 709/220 |
| 2002/0120743 A1 | 8/2002 | Shabtay et al. ............... 709/226 |
| 2002/0120763 A1 | 8/2002 | Miloushev et al. |
| 2002/0124080 A1 | 9/2002 | Leighton et al. |
| 2002/0124096 A1 | 9/2002 | Loguinov et al. |
| 2002/0133601 A1 | 9/2002 | Kennamer et al. ........... 709/229 |
| 2002/0150048 A1 | 10/2002 | Ha et al. |
| 2002/0154600 A1 | 10/2002 | Ido et al. |
| 2002/0156916 A1 | 10/2002 | Watanabe |
| 2002/0186698 A1* | 12/2002 | Ceniza ......................... 370/401 |
| 2002/0188862 A1 | 12/2002 | Trethewey et al. ........... 713/201 |
| 2002/0194324 A1 | 12/2002 | Guha |
| 2002/0194335 A1 | 12/2002 | Maynard ....................... 709/225 |
| 2003/0018796 A1 | 1/2003 | Chou et al. |
| 2003/0031185 A1 | 2/2003 | Kikuchi et al. |
| 2003/0035430 A1 | 2/2003 | Islam et al. ................... 370/401 |
| 2003/0065711 A1 | 4/2003 | Acharya et al. .............. 709/203 |
| 2003/0065762 A1 | 4/2003 | Stolorz et al. |
| 2003/0065763 A1 | 4/2003 | Swildens et al. ............. 709/224 |
| 2003/0074472 A1 | 4/2003 | Lucco et al. |
| 2003/0105797 A1 | 6/2003 | Dolev et al. .................. 709/105 |
| 2003/0115283 A1 | 6/2003 | Barbir et al. |
| 2003/0135509 A1 | 7/2003 | Davis et al. .................. 707/100 |
| 2003/0154239 A1 | 8/2003 | Davis et al. .................. 709/201 |
| 2003/0177724 A1 | 9/2003 | Gulko et al. |
| 2003/0210686 A1 | 11/2003 | Terrell et al. ................. 370/389 |
| 2003/0210694 A1 | 11/2003 | Jayaraman et al. .......... 370/392 |
| 2003/0229697 A1 | 12/2003 | Borella |
| 2004/0019680 A1 | 1/2004 | Chao et al. |
| 2004/0024872 A1 | 2/2004 | Kelley et al. ................. 709/225 |
| 2004/0039798 A1 | 2/2004 | Hotz et al. |
| 2004/0039847 A1 | 2/2004 | Persson et al. |
| 2004/0064577 A1 | 4/2004 | Dahlin et al. |
| 2004/0194102 A1 | 9/2004 | Neerdaels |
| 2004/0249939 A1 | 12/2004 | Amini et al. |
| 2004/0249971 A1 | 12/2004 | Klinker |
| 2004/0255018 A1 | 12/2004 | Taraci |
| 2004/0259565 A1 | 12/2004 | Lucidarme |
| 2005/0002410 A1 | 1/2005 | Chao et al. |
| 2005/0021883 A1 | 1/2005 | Shishizuka et al. ............ 710/20 |
| 2005/0033858 A1 | 2/2005 | Swildens et al. ............. 709/232 |
| 2005/0086295 A1 | 4/2005 | Cunningham et al. ....... 709/203 |
| 2005/0149531 A1 | 7/2005 | Srivastava ...................... 707/10 |
| 2005/0169180 A1 | 8/2005 | Ludwig |
| 2005/0286416 A1 | 12/2005 | Shimonishi et al. |
| 2006/0020715 A1 | 1/2006 | Jungck |
| 2006/0036743 A1 | 2/2006 | Deng et al. |
| 2006/0167894 A1 | 7/2006 | Wunner |
| 2006/0209689 A1 | 9/2006 | Nakano et al. |
| 2007/0168448 A1 | 7/2007 | Garbow et al. |
| 2007/0168547 A1 | 7/2007 | Krywaniuk |
| 2007/0180113 A1 | 8/2007 | Van Bemmel |
| 2007/0208877 A1 | 9/2007 | Kelley et al. |
| 2008/0016233 A1 | 1/2008 | Schneider |
| 2008/0037420 A1 | 2/2008 | Tang |
| 2008/0123597 A1 | 5/2008 | Arbol et al. |
| 2008/0144784 A1 | 6/2008 | Limberg |
| 2008/0147866 A1 | 6/2008 | Stolorz et al. |
| 2008/0207200 A1 | 8/2008 | Fein et al. |
| 2010/0010991 A1 | 1/2010 | Joshi |
| 2010/0011120 A1 | 1/2010 | Kommula |
| 2010/0011126 A1 | 1/2010 | Hsu et al. |
| 2010/0082787 A1 | 4/2010 | Kommula et al. |
| 2010/0121932 A1 | 5/2010 | Josh et al. |
| 2010/0153558 A1 | 6/2010 | Kommula |
| 2010/0223621 A1 | 9/2010 | Joshi |
| 2010/0251008 A1 | 9/2010 | Swildens |
| 2010/0293296 A1 | 11/2010 | Hsu et al. |
| 2010/0299427 A1 | 11/2010 | Joshi |
| 2011/0099261 A1 | 4/2011 | Joshi |
| 2011/0122771 A1 | 5/2011 | Joshi |
| 2011/0191459 A1 | 8/2011 | Joshi |
| 2011/0264798 A1 | 10/2011 | Joshi |
| 2012/0096166 A1 | 4/2012 | Devarapalli et al. |

OTHER PUBLICATIONS

Cardellini et al., "Dynamic Load Balancing on Web-server Systems", IEEE, pp. 1-24, 1999.*

Genova et al., "Challenges in URL Switching for Implementing Globally Distributed Web Sites", IEEE, pp. 89-84, 2000.*

AlteonWebSystem, "PCD White Paper", AlteonWebSystem, pp. 1-8, Mar. 2001.*

AlteonWebSystem, "Enhancing Web User Experience with Global Server Load Balancing", Jun. 1999, Alteon WebSystems, Inc., pp. 1-7.*

Cisco Document, "Configuring the CSS Domain Name Service", posted on Dec. 2000, Cisco Systems Inc., http://www.ciscosystems.com, pp. 1-13.*

Tao Zhou, "Web Server Load Balancers", 2000, Windows IT Pro, http://windowsitpro.com/networking/web-server-load-balancers, 7 pages.*

Michael Hasenstein, "IP Address Translation", 1997, http://www.csn.tu.chemnitz.de/HyperNews/get/linux-ip-nat-html, 50 pages.*

Michael Hasenstein, "Linux Ip Network Address Translation", Dec. 2003, Linux IP NAT Forum, http://www.hasenstein.com/HyperNews/get/linux-ip-nat.html, 12 pages.*

Tony Bourke, "Server Load Balancing", 2001, O'Reilly & Associates, Inc., 182 pages.*

Albitz, P., et al., "DNS and BIND in a Nutshell," O'Reilly & Associates, Sebastopol, CA, 1992, pp. 214-215.

Alteon Systems, "Alteon WebSystems Introduces New Layer 4+ Switching Technology that Speeds User Access to Internet Servers," Dec. 7, 1998, retrieved Nov. 5, 2002, from http://web.archive.org/web/20000919190409/www.alteonwebsystems.com/press/releases/1998/120798.asp, pp. 1-4.

Alteon WebSystems, Inc., "Enhancing Web User Experience with Global Server Load Balancing," Jun. 1999, 8 pages.

Krapf, E., "Alteon's Global Server Load Balancing," *Business Communications Review*, Jan. 1999, p. 60, retrieved Oct. 25, 2002, from http://www.bcr.com/bcrmag/1999/01/p60.asp, 3 pages.

Nortel Networks, "Alteon Personal Content Director," © 2001, can be retrieved from http://www.nortelnetworks.com/personalinternet, 4 pages.

(56) References Cited

OTHER PUBLICATIONS

IBM Corp., *IBM WebSphere Performance Pack: Load Balancing with IBM SecureWay Network Dispatcher*, First Edition, Chapters 1, 2, 4, and 8, Oct. 1999.
IBM Corp., *SecureWay® Network Dispatcher: User's Guide—Version 2.1 for AIX, Solaris, and Windows NT*, Third Edition, Chapters 3, 4, 9, 10, 11, and Appendices C & E, Mar. 1999.
Yerxa, G., "ACElerate on Fast Track for Load-Balancing," Mar. 8, 1999, retrieved Nov. 5, 2002, from http://www.networkcomputing.com/1005/1005sp2.html, pp. 1-4.
Bestavros, Azer, "WWW Traffic Reduction and Load Balancing through Server-Based Caching," *IEEE Concurrency*, pp. 56-57, Jan.-Mar. 1997.
Paul, Arindam et al., "Balancing Web Server Load for Adaptable Video Distribution," *IEEE* pp. 469-476, 2000.
U.S. Appl. No. 11/707,697, filed Feb. 16, 2007, Kommula et al.
Genova, Z., et al., "Challenges to URL Switching for Implementing Globally Distributed Web Sites," Department of Computer Science and Engineering, University of South Florida, pp. 1-9, Aug. 11, 2000.
U.S. Appl. No. 09/670,487, filed Sep. 26, 2000, Hsu et al.
U.S. Appl. No. 10/206,580, filed Jul. 25, 2002, Kommula et al.
U.S. Appl. No. 10/214,921, filed Aug. 7, 2002, Kommula.
U.S. Appl. No. 10/305,823, filed Nov. 27, 2002, Joshi et al.
U.S. Appl. No. 10/376,903, filed Feb. 28, 2003, Kommula.
U.S. Appl. No. 10/377,364, filed Feb. 28, 2003, Kommula.
U.S. Appl. No. 10/839,919, filed May 6, 2004, Joshi.
U.S. Appl. No. 10/840,496, filed May 6, 2004, Joshi.
U.S. Appl. No. 10/924,552, filed Aug. 23, 2004, Joshi.
U.S. Appl. No. 11/429,177, filed May 5, 2006, Joshi et al.
Joshi, "Smoothing Algorithm for Round Trip Time (RTT) Measurements," assigned U.S. Appl. No. 12/177,021, filed Jul. 21, 2008.
U.S. Appl. No. 11/741,480, filed Apr. 27, 2007, Hsu et al.
U.S. Appl. No. 12/272,618, filed Nov. 17, 2008, Hsu et al.
U.S. Appl. No. 12/353,701, filed Jan. 14, 2009, Joshi.
Doeringer et al., "Routing on Longest-Matching Prefixes," IEEE/ACM Transactions on Networking, vol. 4, No. 1, Feb. 1996, pp. 86-97.
Joshi, U.S. Appl. No. 13/008,321, filed Jan. 18, 2011, 36 pages.
Joshi, U.S. Appl. No. 13/023,292, filed Feb. 8, 2011, 30 pages.
Final Office Action for U.S. Appl. No. 12/496,560, mailed on Jan. 28, 2011, 10 pages.
Office Action for U.S. Appl. No. 11/707,697, mailed on Nov. 22, 2010, 24 pages.
Joshi et al., U.S. Appl. No. 13/229,380, filed Sep. 9, 2011.
Civil Action CV10-03428, Second Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., with Exhibits A-P, filed on Apr. 13, 2011, 238 pages.
Civil Action CV10-03428, Third Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., filed on Apr. 29, 2011, 42 pages.
Civil Action CV10-03428, Answer to Third Amended Complaint, Affirmative Defenses, and Counterclaims, filed on May 16, 2011, 40 pages.
Civil Action CV10-03428, Answer to Defendant A10 Networks, Inc.'s Counterclaims, and Counterclaim, filed on May 27, 2011, 12 pages.
Delgadillo, K., "Cisco Distributed Director," Cisco White Paper, 1999, 19 pages.
Table of Contents for 2nd Conference on Telecommunications (ConfTele'99), Apr. 15-16, 1999, 9 pages.
Bernardo, L. et al., "Scalability Issues in Telecommunication Services," in Proceedings of 2nd Conference on Telecommunications (ConfTele'99), Apr. 15-16, 1999, pp. 409-413.
Lin, "VPN Tunnel Balancer," U.S. Prov. App. No. 60/169,502, filed Dec. 7, 1999, 7 pages.
Cisco Systems, Inc., "Cisco LocalDirector Version 1.6.3 Release Notes," Oct. 1997, 52 pp., San Jose, CA.
Foundry Networks, Inc., "Foundry ServerIron Installation and Configuration Guide," May 2000, 784 pages.
Dell Computer Corporation, "3-DNS Reference Guide, Version 4.2," 2002, 261 pages.
Schemers III, "lbnamed: A Load Balancing Name Server in Perl," 1995 LISA IX, Sep. 17-22, 1995, Monterey, CA, 13 pages.
Goldszmidt, "Load Distribution for Scalable Web Servers: Summer Olympics 1996," in Proceedings of the 8th IFIP/IEEE International Workshop on Distributed Systems: Operations and Management, Sydney, Australia, Oct. 1997, 10 pages.
"Use F5 Networks' 3DNS Controller to Supercharge Standard DNS Capabilities," Jul. 1999, F5 White Paper, Seattle, WA.
Buyya, "High Performance Cluster Computing: Architectures and Systems," vol. 1, copyright 1999, Prentice Hall PTR, Upper Saddle River, New Jersey 07458, http://www.phptr.com.
Civil Action CV10-03428—A10 Networks, Inc.'s Answer to Plaintiffs Brocade Communications Systems, Inc. And Foundry Networks, LLC's Counterclaims, Filed Jun. 17, 2011, 4 pages.
Civil Action CV10-03428—Notice of Granted Requests for Reexamination of Patents 7,547,508 and 7,270,977, Filed Aug. 1, 2011, 31 pages, including Exhibits A and B.
Civil Action CV10-03428—Notice of Granted Requests for Reexamination of Patents 7,558,195, 7,657,629, 7,840,678, Filed Aug. 5, 2011, 316 pages.
Civil Action CV10-03428—Notice of Granted Requests for Reexamination of Patent 7,584,301, Filed Aug. 12, 2011, 14 pages, including Exhibit A.
Civil Action CV10-03428—Joint Claim Construction, Filed Aug. 26, 2011, 29 pages.
Civil Action CV10-03428—Notice of Granted Requests for Reexamination of Patents 7,774,833; 7,454,500; 7,899,899; 7,754,965; 7,647,427; and 7,716,370, Filed Sep. 6, 2011, 72 pages, including Exhibits A through F.
Civil Action CV10-03428—Defendant's A10 Networks, Inc.'s, Lee Chen's, Rajkumar Jalan's, Ron Szeto's, David Cheung's, Liang Han's, and Steven Hwang's Invalidity Contentions, Filed Jun. 27, 2011, 779 pages, Including Exhibits A through M.
Skene et al., "Method and System for Balancing Load Distribution on a Wide Area Network," U.S. Appl. No. 09/459,815, filed Dec. 13, 1999, 59 pages.
Skene et al., "Method and System for Name Server Load Balancing," U.S. Prov. Appl. No. 60/182,812, filed Feb. 16, 2000, 16 pages.
Tsimelzon et al., "Java application framework for an internet content delivery network," U.S. Prov. Appl. No. 60/347,481, filed Jan. 11, 2002, 26 pages.
"Foundry Networks Announces Application Aware Layer 7 Switching on ServerIron Platform," Mar. 1999, 4 pages.
Civil Action CV10-03428, Order Construing Disputed Claim Terms of U.S. Pat. No. 7,647,427; 7,716,370; 7,558,195; 7,454,500; 7,581,009; 7,657,629; 7,584,301; 7,840,678; and 5,875,185, issued Jan. 6, 2012, 33 pages.
Information Disclosure Statement filed on Apr. 4, 2004, for U.S. Pat. No. 7,308,475, 5 pages.
Release Note: 3-DNS Controller, version 4.5, Mar. 5, 2007, 19 pages.
F5 Networks' Newest Wide Area Traffic Management Solution Enables Enterprises to Meet Global e-Business Objectives, Business Wire, Feb. 19, 2002, 4 pages.
Release Note: 3-DNS Controller, version 4.2, Feb. 13, 2002, 23 pages.
Huang et al., "A DNS Reflection Method for Global Traffic Management," Proceedings USENIX Annual Technical Conference (ATC'10), 2010, 7 pages.

(56) References Cited

OTHER PUBLICATIONS

Civil Action CV10-03428, Expert Report of J. Douglas Tygar in Support of Defendant and Counterclaimant A10 Networks, Inc.'s, and Defendant Lee Chen's and Rajkumar Jalan's Invalidity Contentions, filed Mar. 23, 2012, 81 pages.
Request for Reexamination of U.S. Pat. No. 7,454,500, filed Jun. 27, 2011, 29 pages.
Notice of Reexamination Request Filing Date and Notice of Assignment of Reexamination Request, mailed Jul. 1, 2011, Reexamination Control No. 90/011,772, 2 pages.
Ex Parte Reexamination Interview Summary for Reexamination Control No. 90/011,772, mailed Jul. 21, 2011, 3 pages.
Order Granting Request for Reexamination of U.S. Pat. No. 7,454,500, mailed Aug. 12, 2011, Reexamination Control No. 90/011,772, 11 pages.
Office Action for Reexamination Control No. 901011,772, mailed Oct. 13, 2011, 8 pages.
Decision on Petition for Extension of Time in Reexamination (Granted), mailed Nov. 17, 2011, Reexamination Control No. 90/011,772, 3 pages.
Ex Parte Reexamination Interview Summary for Reexamination Control No. 90/011,772, mailed on Nov. 29, 2011, 58 pages.
Ex Parte Reexamination Interview Summary for Reexamination Control No. 90/011,772, mailed on Apr. 10, 2012, 3 pages.
Final Office Action for Reexamination Control No. 90/011,772, mailed May 17, 2012, 53 pages.
Request for Inter Partes Reexamination of U.S. Pat. No. 7,454,500, filed Nov. 4, 2011, 157 pages.
Notice of Assignment of Inter Partes Reexamination Request and Notice of Reexamination Request Filing Date, mailed Nov. 18, 2011, Reexamination Control No. 95/001,806, 2 pages.
Order Granting Request for Inter Partes Reexamination of U.S. Pat. No. 7,454,500 and Office Action for Reexamination Control No. 95/001,806, mailed Dec. 16, 2011, 43 pages.
Third Party Requester's Opposition to Petition to Vacate, for Reexamination Control No. 95/001,806, filed Mar. 1, 2012, 15 pages.
Third Party Requester's Opposition to Petition to Suspend Reexamination for Reexamination Control No. 95/001,806, filed Mar. 2, 2012, 14 pages.
Third Party Requester's Comments under 35 U.S.C. § 314(B)(2) and 37 C.F.R. § 1.947, for Reexamination Control No. 95/001,806, filed Mar. 19, 2012, 36 pages.
Third Party Requester's Opposition to Patent Owner's Petition to "Supplement," for Reexamination Control No. 95/001,806, filed Apr. 19, 2012, 21 pages.
Civil Action 10-332—Brocade Communication Systems, Inc. v. A10 Networks, Inc.—Civil Cover Sheet, filed on Apr. 23, 2010, 1 page.
Civil Action—Case No. CV10-03443—Complaint for Declaratory Judgment, filed on Aug. 6, 2010, with Exhibits A through I, 153 pages.
Civil Action—Case No. CV10-03443—Notice of Voluntary Dismissal Without Prejudice, filed on Aug. 16, 2010, 2 pages.
Civil Action—CV10-03428—Order Reassigning Case. Case reassigned to Judge Hon. Lucy H. Koh for all further proceedings. Judge Magistrate Judge Elizabeth D. Laporte no longer assigned to the case, filed Aug. 16, 2010, 1 page.
Civil Action—CV10-03428—Motion to Dismiss Complaint filed by A10 Networks, Inc., Lee Chen, Rajkumar Jalan, Ron Szeto, filed Oct. 11, 2010, 30 pages.
Civil Action CV10-03428—Defendant, David Cheung's Answer to Plaintiffs First Amended Complaint, filed Nov. 11, 2010, 32 pages.
Civil Action CV10-03428—Notice of Motion and Motion to Dismiss First Amended Complaint filed by A10 Networks, Inc., Lee Chen, Rajkumar Jalan, Ron Szeto, filed Nov. 12, 2010, 34 pages.
Civil Action CV10-03428—Declaration of Scott R. Mosko in Support of Motion to Dismiss First Amended Complaint, filed by A10 Networks, Inc., Lee Chen, Rajkumar Jalan, Ron Szeto, filed Nov. 12, 2010, 56 pages. Included: Exhibits A and B.
Civil Action CV10-03428—Memorandum in Opposition re Motion to Dismiss First Amended Complaint, filed by Brocade Communications Systems, Inc., Foundry Networks, LLC, filed Jan. 27, 2011, 33 pages.
Civil Action CV10-03428—Reply to Opposition re Motion to Dismiss First Amended Complaint, filed by A10 Networks, Inc., Lee Chen, Liang Han, Steve Hwang, Rajkumar Jalan, Ron Szeto, filed Feb. 3, 2011, 20 pages.
Civil Action CV10-03428—Order by Judge Lucy H. Koh granting in part and denying in part Motion to Dismiss First Amended Complaint, filed Mar. 23, 2011, 19 pages.
Civil Action CV10-03428—Motion to Stay Defendants' Motion to Stay Proceedings Pending Reexaminations filed by A10 Networks, Inc., Lee Chen, Liang Han, Steve Hwang, Rajkumar Jalan, Ron Szeto, filed Jul. 1, 2011, 26 pages. Included: Affidavit Declaration of Scott R. Mosko in Support of Motion; Proposed Order, Exhibits 1 and 2.
Civil Action CV10-03428—Opposition to Motion to Stay Proceedings Pending Reexaminations, filed by Brocade Communications Systems, Inc., Foundry Networks, LLC, filed Jul. 15, 2011, 20 pages. Included: Proposed Order.
Civil Action CV10-03428—Declaration of Siddhartha M. Venkatesan in Support of Opposition/Response to Motion, Plaintiffs' Opposition to Defendants' Motion to Stay Proceedings, filed by Brocade Communications Systems, Inc., Foundry Networks, Llc, filed Jul. 15, 2011, 70 pages. Included: Exhibits A through E.
Civil Action CV10-03428—Reply to Plaintiffs' Opposition to Defendants' Motion to Stay Proceedings Pending Reexaminations, filed by A10 Networks, Inc., filed Jul. 22, 2011, 34 pages. Included: Declaration of Scott R. Mosko, Exhibits A, C, and D.
Civil Action CV10-03428—Memorandum in Support of Motion for Temporary Restraining Order and Preliminary Injunction [Redacted Version] filed by Brocade Communications Systems, Inc., Foundry Networks, LLC, filed Jul. 26, 2011, 34 pages. Included: Proposed Order for Temporary Restraining Order and Order to Show Cause and Proposed Preliminary Injunction.
Civil Action CV10-03428—Declaration of Andrew (Andy) Guerrero in Support of Motion for Temporary Restraining Order [Redacted Version] of Plaintiffs' Memorandum in Support of Motion for Temporary Restraining Order and Preliminary Injunction [Redacted Version] of Andrew (Andy) Guerrero ISO Plaintiffs' Motion for TRO and Preliminary Injunction filed by Brocade Communications Systems, Inc., Foundry Networks, LLC, filed Jul. 26, 2011, 3 pages.
Civil Action CV10-03428—Declaration of Fabio E. Marino in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino Iso Plaintiffs' Motion for TRO and Preliminary Injunction filed by Brocade Communications Systems, Inc., Foundry Networks, LLC, filed Jul. 26, 2011, 2 pages.
Civil Action CV10-03428—Declaration of Keith Stewart in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 5 pages.
Civil Action CV10-03428—Declaration of Mani Prasad Kancherla in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 5 pages.
Civil Action CV10-03428—Declaration of Prasad Aluri in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and

(56) References Cited

OTHER PUBLICATIONS

Preliminary Injunction filed by Brocade Communications Systems, Inc., Foundry Networks, LLC, filed Jul. 26, 2011, 3 pages.
Civil Action CV10-03428—Declaration of Robert D. Young in Support of Motion for Temporary Restraining Order [Redacted Version] of Plaintiffs' Memorandum in Support of Motion For Temporary Restraining Order And Preliminary Injunction [Redacted Version] of Declaration of Fabio E. Marino ISo Plaintiffs' Motion For TRO and Preliminary Injunction filed by Brocade Communications Systems, Inc., Foundry Networks, LLC, filed Jul. 26, 2011, 46 pages. Included: Redacted Exhibits 1 through 8.
Civil Action CV10-03428—Declaration of Lisa McGill in Support of Motion for Temporary Restraining Order [Redacted Version] of Plaintiffs' Memorandum in Support Of Motion For Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 506 pages. Included: Exhibits 1 through 30. (due to size, this references will be submitted in three parts).
Civil Action CV10-03428—Plaintiffs' Reply Memorandum in Further Support of Motion for Temporary Restraining Order And Preliminary Injunction [Redacted Version] filed by Brocade Communications Systems, Inc., Foundry Networks, LLC, filed Aug. 4, 2011, 22 pages.
Civil Action CV10-03428—Notice of Errata re Reply Memorandum in Further Support of Motion For Temporary Restraining Order and Preliminary Injunction, filed by Brocade Communications Systems, Inc., Foundry Networks, LLC, filed Aug. 5, 2011, 2 pages.
Civil Action CV10-03428—Order by Judge Lucy H. Koh denying Motion to Stay; finding as moot Motion to Compel; denying Motion to Qualify Expert Kevin Jeffay Under the Protective Order; granting in part and denying in part Motion for Sanctions; granting Motion to Order A10 to File Confidential Information Under Seal; granting Motion for Leave to File Supplemental Authority, filed Aug. 12, 2011, 2 pages.
Civil Action CV10-03428—Order Denying Motion for Temporary Restraining Order [Redacted Version] of Plaintiffs' Memorandum In Support Of Motion For Temporary Restraining Order And Preliminary Injunction, file by Brocade Communications Systems, Inc., Foundry Networks, LLC, filed Aug. 16, 2011, 5 pages.
Civil Action CV10-03428—Notice of Granted Request for Reexamination of U.S. Pat. No. 7,581,009, filed Sep. 27, 2011, 18 pages.
Civil Action CV10-03428—Redacted Declaration of David Klausner in Support of Opposition to Plaintiffs' Motion for Temporary Restraining Order and Preliminary Injunction, by A10 Networks, Inc., filed Sep. 28, 2011, 9 pages.
Civil Action CV10-03428—Redacted Declaration of Dr. Chi Zhang in Support of Opposition to Plaintiffs' Motion for Temporary Restraining Order and Preliminary Injunction, filed by A10 Networks, Inc., filed Sep. 28, 2011, 4 pages.
Civil Action CV10-03428—Notice of Motion for Partial Summary Judgment on Assignor Estoppel, filed by Brocade Communications Systems, Inc., Foundry Networks, LLC, filed Oct. 11, 2011, 21 pages.
Civil Action CV10-03428—Declaration of Teri H.P. Nguyen in Support of Motion for Partial Summary Judgment Notice of Motion and Motion for Partial Summary Judgment on Assignor Estoppel, filed by Brocade Communications Systems, Inc., Foundry Networks, LLC, filed Oct. 11, 2011, 259 pages. Included: Exhibits A through R.
Civil Action CV10-03428—Initial Claim Construction Brief, filed by Brocade Communications Systems, Inc., Foundry Networks, LLC, filed Oct. 11, 2011, 31 pages.
Civil Action CV10-03428—Declaration of Nitin Gambhir of Brocade Communications Systems, Inc. And Foundry Networks, LLC's Motion for Summary Judgment of Infringement of U.S. Pat. No. 7,454,500; 7,581,009; 7,657,629; 7,584,301; 7,840,678; 7,716,370; 7,647,427; and 7,558,195 filed by Brocade Communications Systems, Inc., Foundry Networks, LLC., filed Oct. 11, 2011, 251 pages. Included: Exhibits A through H and Proposed Order.
Civil Action CV10-03428—Administrative Motion to File Under Seal Brocade Communications Systems, Inc. and Foundry Networks, LLC's Administrative Motion for Leave to File Under Seal Notice of Errata and Submission of Corrected Brief, filed by Brocade Communications Systems, Inc., Foundry Networks, LLC, filed Oct. 13, 2011, 8 pages. Included: Proposed Order and Declaration.
Civil Action CV10-03428—Order by Judge Lucy H. Koh denying Motion for Leave to File Excess Pages and Striking Plaintiffs' Motion for Summary Judgment on Infringement, filed Oct. 18, 2011, 2 pages.
Civil Action CV10-03428—Declaration of Nitin Gambhir in Support of Brocade Communications, Inc. and Foundry Networks, LLCs Motion for Summary Judgment of Infringement of U.S. Pat. No. 7,454,500; 7,581,009; 7,657,629; 7,584,301; and 7,840,678, filed by Brocade Communications Systems, Inc., Foundry Networks, LLC, filed Oct. 21, 2011, 162 pages.
Civil Action CV10-03428—Opposition re Motion for Partial Summary Judgment on Assignor Estoppel Defendant and Counterclaimant A10 Networks, Inc.'s, and Defendants Lee Chen's, Rajkumar Jalan's, and Ron Szeto's Opposition to Plaintiffs Brocade Communications Systems, Inc.'s and Foundry Networks, LLC's Motion for Partial Summary Judgment on Assignor Estoppel, filed by A10 Networks, Inc., Lee Chen, Rajkumar Jalan, Ron Szeto, filed Nov. 8, 2011, 17 pages.
Civil Action CV10-03428—Responsive Claim-Construction Brief (PLR 4-5(b)) by A10 Networks, Inc., Lee Chen, Rajkumar Jalan, filed Nov. 15, 2011, 28 pages.
Civil Action CV10-03428—Declaration of Scott R. Mosko in Support of Defendant and Counterclaimant A10 Networks, Inc.'s and Defendants Lee Chen's and Rajkumar Jalan's Responsive Claim Construction Brief (PLR 4-5(b)) filed by A10 Networks, Inc., Lee Chen, Rajkumar Jalan, filed Nov. 15, 2011, 70 pages. Included: Exhibits A through F.
Civil Action CV10-03428—Declaration of J. Douglas Tygar, Ph.D. In Support of Defendant and Counterclaimant A10 Networks, Inc.'s and Defendants Lee Chen's and Rajkumar Jalan's Responsive Claim Construction Brief (PLR 4-5(b)) filed by A10 Networks, Inc., Lee Chen, Rajkumar Jalan, filed on Nov. 15, 2011, 77 pages.
Civil Action CV10-03428—Opposition re Motion for Summary Judgment of Noninfringement of U.S. Pat. No. 5,875,185; Motion for Partial Summary Judgment of U.S. Pat. No. 7,454,500; 7,581,009; 7,657,629; 7,584,301; and 7,840,678, filed by A10 Networks, Inc., Lee Chen, Rajkumar Jalan, filed Nov. 15, 2011, 20 pages.
Civil Action CV10-03428—Declaration of Scott R. Mosko in Support of Defendant and Counterclaimant A10 Networks, Inc.s, and Defendants Lee Chens and Rajkumar Jalans Opposition to Plaintiffs Brocade Communications, Inc. And Foundry Networks, LLCs Motion for Partial Summary Judgment of U.S. Pat. No. 7,454,500; 7,581,009; 7,657,629; 7,584,301; and 7,840,678 filed by A10 Networks, Inc., Lee Chen, Rajkumar Jalan, filed Nov. 15, 2011, 16 pages.
Civil Action CV10-03428—Administrative Motion to Consider Whether Cases Should be Related, filed by Brocade Communications Systems, Inc., Foundry Networks, LLC, filed Nov. 21, 2011, 8 pages. Included: Declaration and Proposed Order.
Civil Action CV10-03428—Reply Claim Construction Brief filed by Brocade Communications Systems, Inc., Foundry Networks, LLC, filed Nov. 22, 2011, 22 pages.
Civil Action CV10-03428—Declaration of Nitin Gambhir in Support of Reply Claim Construction Brief, filed by Brocade Communications Systems, Inc., Foundry Networks, LLC, filed Nov. 22, 2011, 12 pages. Included: Exhibit A.
Civil Action CV10-03428—Motion to Stay Defendant and Counterclaimant A10 Networks, Inc.'s and Defendants Lee Chen's Rajkumar Jalan's, Ron Szeto's and Steve Hwang's Renewed Motion to Stay All Proceedings Pending Inter Partes Reexamination (All Patents Asserted by Plaintiffs) filed by A10 Networks, Inc., Lee Chen, Steve Hwang, Rajkumar Jalan, Ron Szeto, filed Nov. 23, 2011, 15 pages. Included: Proposed Order.

(56) References Cited

OTHER PUBLICATIONS

Civil Action CV10-03428—Declaration of Scott A. Herbst Declaration of Scott A. Herbst in Support of Defendant and Counterclaimant A10 Networks, Inc.s and Defendants Lee Chens, Rajkumar Jalans, Ron Szetos, and Steve Hwangs Renewed Motion to Stay All Proceedings Pending Inter Partes Reexamination (All Patents Asserted by Plaintiffs) filed byAl 0 Networks, Inc., Lee Chen, Steve Hwang, Rajkumar Jalan, Ron Szeto, filed Nov. 23, 2011, 25 pages. Included: Exhibits 1 through 6.

Civil Action CV10-03428—Litigation Docket, printed on Nov. 26, 2011, 2011, 44 pages.

Civil Action CV10-03428—Stipulation Regarding Plaintiffs' Motion for Partial Summary Judgment of Assignor Estoppel, filed Nov. 30, 2011, 2 pages.

Civil Action CV10-03428—Brocades Opposition to Defendant's Motion to Stay Proceedings Pending Reexaminations, filed Dec. 7, 2011, 18 pages.

Civil Action CV10-03428—Defendant and Counterclaimant A10 Networks, Inc.'s and Defendants Lee Chen's, Rajkumar Jalan's, Ron Szeto's, and Steve Hwang's Reply in Support of its Renewed Motion to Stay Proceedings Pending Inter Partes Reexaminations (All Patents Asserted by Plaintiffs), Filed Dec. 14, 2011, 11 pages.

Civil Action CV10-03428—Defendant and Counterclaimant A10 Networks, Inc.'s Notice of Granted Requests for Inter Partes Reexamination of Plaintiffs' U.S. Pat. No. 7,558,195; 7,454,500; 7,574,508; and 7,720,977, filed Dec. 28, 2011, 3 pages.

Civil Action CV10-03428—Defendant and Counterclaimant A10 Networks, Inc.'s Notice of Granted Request for Inter Partes Reexamination of Plaintiffs' U.S. Pat. No. 7,581,301, filed Dec. 29, 2011, 3 pages.

Civil Action CV10-03428—Defendant and Counterclaimant A10 Networks, Inc.'s Notice of Granted Request for Inter Partes Reexamination of Plaintiffs' U.S. Pat. No. 7,657,629 and 7,840,678, filed Jan. 20, 2012, 3 pages.

Civil Action CV10-03428—Defendant and Counterclaimant A10 Networks, Inc.'s Notice regarding Inter Partes Reexaminations of Plaintiffs' Asserted Patents: (i) Four Newly-Granted Requests (U.S. Pat. No. 7,774,833; 7,647,427; 7,716,370; 7,581,009); and (ii) Status Updated for Eleven Already-Instituted Reexaminations (U.S. Pat. No. 7,774,833; 7,647,427; 7,716,370; 7,581,009; 7,657,629; 7,840,678; 7,584,301; 7,558,195; 7,454,500; 7,720,977; and 7,574,508), filed Feb. 6, 2012, 3 pages.

Civil Action CV10-03428—Defendant and Counterclaimant A10 Networks, Inc.'s Notice of Granted Request for Inter Partes Reexamination of Plaintiffs' U.S. Pat. No. 7,756,965 and Status Update, filed Feb. 16, 2012, 3 pages.

Civil Action CV10-03428 — Defendant and Counterclaimant A10 Networks, Inc.'s Notice of Requests for Reexaminations Granted re Patents 7,558,195; 7,657,629; and 7,840,678, filed Aug. 5, 2011, 3 pages.

Civil Action CV10-03428—Defendant and Counterclaimant A10 Networks, Inc.'s Notice of Granted Request for Reexamination of u.S. Pat. No. 7,584,301, filed Aug. 12, 2011, 3 pages.

Civil Action CV10-03428—Defendant and Counterclaimant A10 Networks, Inc.'s Motion for Summary Judgment of Noninfringement of U.S. Pat. Nos. 7,647,427 and 7,716,370, filed Oct. 11, 2011, 14 pages.

Civil Action CV10-03428—Declaration of John Chiong in Support of Defendant and Counterclaim-Plaintiff A10 Networks, Inc.'s and Defendants Lee Chen's and Rajkumar Jalan's Motion for Summary Judgment of Noninfringement of U.S. Pat. No. 7,647,427 and 7,716,370, filed Oct. 11, 2011, 3 pages.

Civil Action CV10-03428—Declaration of Scott A. Herbst in Support of Defendant and Counterclaim-Plaintiff A10 Networks, Inc.'s and Defendants Lee Chen's and Rajkumar Jalan's Motion for Summary Judgment of Noninfringement of U.S. Pat. Nos. 7,647,427 and 7,716,370, filed Oct. 11, 2011, 3 pages.

Civil Action CV10-03428—Declaration of Nitin Gambhir in Support of Brocade Communications Systems, Inc.'s and Foundry Networks, LLC's (1) Motion for Partial Summary Judgment of Infringement of U.S. Pat. No. 7,647,427 and 7,716,370 [Filed Under Seal]; (2) Opposition to Defendants' Motion for Summary Judgment of Non-Infringement of U.S. Pat. No. 7,647,427 and 7,716,370 [Filed Under Seal]; and (3) Opposition to Defendants' Motion for Summary Judgment of Non-Infringement of U.S. Pat. No. 7,558,195 [Filed Under Seal], filed Nov. 8, 2011, 153 pages.

Civil Action CV10-03428—Defendant and Counterclaimant A10 Networks, Inc.'s Reply in Support of Motion for Summary Judgment of U.S. Pat. No. 7,647,427 and 7,716,370, filed Nov. 22, 2011, 17 pages.

Civil Action CV10-03428—Declaration of Siddhartha M. Venkatesan in Support of Opposition to Motion to Stay Proceedings Pending Reexaminations, filed Dec. 7, 2011, 3 pages.

Civil Action CV10-03428—Declaration of Azer Bestavros in Support of Brocade's Claim Construction Brief, filed Oct. 20, 2011, 24 pages.

Civil Action CV10-03428—Declaration of Izhak Rubin in Support of Brocade Communications Systems, Inc.'s and Foundry Networks, LLC's: (1) Claim Construction Brief; (2) Opposition to Defendants' Motion for Summary Judgment of Non-Infringement of U.S. Pat. No. 7,647,427 and 7,716,370; and (3) Opposition to Defendants' Motion for Summary Judgment of Non-Infringement of U.S. Pat. No. 7,558,195, filed Nov. 18, 2011, 34 pages.

Civil Action CV10-03428 —Order by Judge Lucy H. Koh Denying A10's Motion for Summary Judgment of NonInfringement; Granting Brocade's Motion for Summary Judgment of NonInfringement, issued Jan. 6, 2012, 20 pages.

Civil Action CV10-03428—A10 Networks, Inc.'s Motion for Leave to File "Notice of Activity Before the Patent Office from the Ongoing Inter Partes and Ex parte Reexaminations of the Asserted Brocade Patents" and Proposed Order, filed Mar. 12, 2012, 10 pages.

Civil Action CV10-03428—Declaration of Scott A. Herbst in Support of A10 Networks, Inc.'s Administrative Motion for Leave to File Notice of Activity Before the Patent Office from the Ongoing Inter Partes and Ex Parte Reexaminations of the Asserted Brocade Patents and Proposed Order, filed Apr. 12, 2012, 70 pages.

Civil Action CV10-03428—Order by Hon. Lucy H. Koh granting Motion for Leave to File "Notice of Acticity Before the Patent Office From the Ongoing Inter Partes and Ex Parte Reexaminations of the Asserted Brocade Patents," issued Mar. 15, 2012, 5 pages.

Civil Action CV10-03428—Declaration of Scott R. Mosko in Support of Defendants A10 Networks, Inc.'s, Lee Chen's, Rajkumar Jalan's, Ron Szeto's and Steve Hwang's Motion for Summary Judgment, filed Apr. 13, 2012, 223 pages.

Civil Action CV10-03428—Declaration of Teri H.P. Nguyen in Support of Plaintiffs' Motion for Partial Summary Judgment Dismissing Invalidity Declaratory Relief Counterclaim and Invalidity Affirmative Defense Regarding U.S. Pat. No. 7,454,500; 7,581,009; 7,55,195; and 7,774,833, filed May 3, 2012, 23 pages.

Civil Action CV10-03428 — Exhibit 17 to Declaration of Scott R. Mosko in Support of Defendants Al 0 Networks, Inc.'s, Lee Chen's, Rajkumar Jalan's, Ron Szeto's and Steve Hwang's Motion for Summary Judgment, filed May 4, 2012, 25 pages.

Civil Action CV10-03428—Amended Declaration of Scott R. Mosko in Support of Defendants A10 Networks, Inc.'s, Lee Chen's, Rajkumar Jalan's, Ron Szeto's and Steve Hwang's Motion for Summary Judgment, filed May 7, 2012, 5 pages.

Civil Action CV10-03428—Defendant and Counterclaimant A10 Networks, Inc.'s Notice of Activity in the Ongoing inter partes and ex parte Reexaminations of the Asserted Brocade Patents, filed May 11, 2012, 5 pages.

Civil Action CV10-03428—Plaintiff's Objections to Declarations Submitted by A10 Networks, Inc., Lee Chen, Rajkumar Jalan, Ron Szeto and Steve Hwang in Support of Their Motion for Partial Summary Judgment, filed May 17, 2012, 3 pages.

Civil Action CV10-03428—Declaration of Elizabeth C. McBride in Support of Plaintiffs Brocade Communications Systems, Inc.'s and Foundry Networks, LLC's Opposition to Defendants' Motion for Summary Judgment, filed May 17, 2012, 135 pages.

Civil Action CV10-03428—Declaration of Gary Hemminger in Support of Brocade Communications Systems, Inc.'s and Foundry Networks, LLC's Opposition to Defendants A10 Networks, Inc.'s,

(56) References Cited

OTHER PUBLICATIONS

Lee Chen's, Rajkumar Jalan's, Ron Szeto's and Steve Hwang's Motion for Summary Judgment, filed May 17, 2012, 3 pages.
Civil Action CV10-03428—Defendants A10 Networks, Inc.'s, Lee Chen's, Rajkumar Jalan's, Ron Szeto's and Steve Hwang's Opposition to Plaintiffs Motion for Partial Summary Judgment Dismissing Invalidity Declaratory Relief Counterclaim and Invalidity Defense Regarding U.S. Pat. No. 7,454,500; 7,581,009; 7,558,195; and 7,774,833, filed May 17, 2012, 30 pages.
Civil Action CV10-03428—Declaration of Scott R. Mosko in Support of Defendants A10 Networks, Inc.'s, Lee Chen's, Rajkumar Jalan's, Ron Szeto's and Steve Hwang's Opposition to Plaintiffs Motion for Partial Summary Judgment Dismissing Invalidity Declaratory Relief Counterclaim and Invalidity Defense Regarding U.S. Pat. No. 7,454,500; 7,581,009; 7,558,195; and 7,774,833, filed May 17, 2012, 13 pages.
Final Office Action for U.S. Appl. No. 11/429,177, mailed Jun. 20, 2012, 47 pages.
Terminal Disclaimer for U.S. Patent App. No. 11/741,480, filed Jan. 29, 2008, 1 page.
Request for Reexamination of U.S. Pat. No. 7,581,009, filed Jun. 27, 2011, 58 pages.
Notice of Reexamination Request Filing Date and Notice of Assignment of Reexamination Request, mailed Jul. 8, 2011, Reexamination Control No. 90/011,770, 2 pages.
Ex Parte Reexamination Interview Summary, for Reexamination Control No. 90/011,770, mailed Jul. 18, 2011, 2 pages.
Order Granting Request for Reexamination of U.S. Pat. No. 7,581,009, mailed Sep. 21, 2011, Reexamination Control No. 90/011,770, 14 pages.
Office Action for Reexamination Control No. 90/011,770, mailed Feb. 16, 2012, 35 pages.
Ex Parte Reexamination Interview Summary, for Reexamination Control No. 90/011,770, mailed Mar. 27, 2012, 3 pages.
Decision on Petition for Extension of Time in Reexamination (Granted), mailed Mar. 28, 2012, Reexamination Control No. 90/011,770, 3 pages.
Request for Inter Partes Reexamination of U.S. Pat. No. 7,581,009, filed Nov. 4, 2011, 197 pages.
Notice of Assignment of Inter Partes Reexamination Request and Notice of Reexamination Request Filing Date, mailed Nov. 10, 2011, Reexamination Control No. 95/001,807, 2 pages.
Order Granting Request for Inter Partes Reexamination of U.S. Pat. No. 7,581,009 and Office Action for Reexamination Control No. 95/001,807, mailed Jan. 31, 2012, 23 pages.
Decision on Petition for Extension of Time in Reexamination (Granted), mailed Mar. 30, 2012, Reexamination Control No. 95/001,807, 3 pages.
Third Party Requester's Opposition to Petition to Vacate, for Reexamination Control No. 95/001,807, filed Apr. 16, 2012, 17 pages.
Third Party Requester's Comments under 35 U.S.C. § 314(B)(2) and 37 C.F.R. § 1.947, with Exhibits 1-7, for Reexamination Control No. 95/001,807, filed May 30, 2012, 145 pages.
Notice of Allowance for U.S. Appl. No. 121496,560, mailed on May 16, 2011, 11 pages.
Office Communication for U.S. Appl. No. 12/496,560, mailed on Jun. 14, 2011, 5 pages.
Office Action for U.S. Appl. No. 12/496,560, mailed on Jun. 15, 2012, 30 pages.
Non-Final Office Action for U.S. Appl. No. 12/272,618, mailed on Jun. 14, 2011, 13 pages.
Final Office Action for U.S. Appl. No. 12/272,618, mailed on Feb. 28, 2012, 12 pages.
Non-Final Office Action for U.S. Appl. No. 11/429,177, mailed May 19, 2011, 87 pages.
Non-Final Office Action for U.S. Appl. No. 11/429,177, mailed Oct. 18, 2011, 25 pages.
Request for Reexamination of U.S. Pat. No. 7,657,629, filed Jun. 27, 2011, 36 pages.
Notice of Reexamination Request Filing Date and Notice of Assignment of Reexamination Request, mailed Jul. 7, 2011, Reexamination Control No. 90/011,766, 2 pages.
Ex Parte Interview Summary for Reexamination Control No. 90/011,766, Jul. 14, 2011, 3 pages.
Order Granting Request for Reexamination of U.S. Pat. No. 7,657,629, mailed Jul. 30, 2011, Reexamination Control No. 90/011,766, 10 pages.
Office Action for Reexamination Control No. 90/011,766, mailed on Oct. 4, 2011, 7 pages.
Ex Parte Reexamination Interview Summary for Reexamination Control No. 90/011,766, mailed on Nov. 29, 2011, 57 pages.
Decision on Petition for Extension of Time in Reexamination (Granted), mailed Dec. 2, 2011, Reexamination Control No. 90/011,766, 3 pages.
Request for Inter Partes Reexamination for U.S. Pat. No. 7,657,629 B1, filed Nov. 17, 2011, 238 pages.
Notice of Inter Partes Reexamination Request Filing Date and Notice of Assignment of Inter Partes Reexamination Request, mailed Dec. 5, 2011, Reexamination Control No. 95/001,824, 2 pages.
Order Granting Request for Inter Partes Reexamination of U.S. Pat. No. 7,657,629 and Office Action for Reexamination Control No. 95/001,824, mailed Jan. 12, 2012, 33 pages.
Third Party Requester's Comments under 35 U.S.C. § 314(B)(2) and 37 C.F.R. § 1.947, for Reexamination Control No. 95/001,824, filed Apr. 11, 2012, 21 pages.
Final Office Action for U.S. Appl. No. 11/707,697, mailed on Apr. 20, 2011, 10 pages.
Notice of Allowance for U.S. Appl. No. 11/707,697, mailed on Aug. 5, 2011, 9 pages.
Notice of Allowance for U.S. Appl. No. 11/707,697, mailed Aug. 12, 2011, 6 pages.
Final Office Action for U.S. Appl. No. 12/635,371, mailed on Mar. 16, 2011, 7 pages.
Office Communication for U.S. Appl. No. 12/635,371, mailed on Mar. 24, 2011, 29 pages.
Non-Final Office Action for U.S. Appl. No. 12/635,371, mailed on Jun. 8, 2011, 9 pages.
Non-Final Office Action for U.S. Appl. No. 12/635,371, mailed on Feb. 15, 2012, 10 pages.
Request for Reexamination of U.S. Pat. No. 7,574,508, filed Jun. 27, 2011, 21 pages.
Notice of Reexamination Request Filing Date and Notice of Assignment of Reexamination Request, mailed Jun. 29, 2011, Reexamination Control No. 90/011,764, 2 pages.
Ex Parte Interview Summary for Reexamination Control No. 90/011,764, Jul. 21, 2011, 3 pages.
Order Granting Request for Reexamination of U.S. Pat. No. 7,574,508, mailed Jul. 22, 2011, Reexamination Control No. 90/011,764, 15 pages.
Office Action for Reexamination Control No. 90/011,764, mailed on Nov. 14, 2011, 18 pages.
Office Action for Reexamination Control No. 90/011,764, mailed on Nov. 18, 2011, 18 pages.
Decision on Petition for Extension of Time in Reexamination (Granted), mailed Jan. 3, 2012, Reexamination Control No. 90/011,764, 3 pages.
Ex Parte Reexamination Interview Summary for Reexamination Control No. 90/011,764, mailed on Jan. 6, 2012, 52 pages.
Request for Inter Partes Reexamination of U.S. Pat. No. 7,574,508, filed Nov. 4, 2011, 70 pages.
Notice of Inter Partes Reexamination Request Filing Date and Notice of Assignment of Inter Partes Reexamination Request, mailed Nov. 8, 2011, Reexamination Control No. 95/001,804, 2 pages.
Order Granting Request for Inter Partes Reexamination of U.S. Pat. No. 7,574,508 and Office Action for Reexamination Control No. 95/001,804, mailed Dec. 8, 2011, 20 pages.
Third Party Requester's Comments under 35 U.S.C. § 314(B)(2) and 37 C.F.R. § 1.947, with Exhibits A-E, for Reexamination Control No. 95/001,804, filed Mar. 9, 2012, 79 pages.

(56) References Cited

OTHER PUBLICATIONS

Non-Final Office Action for U.S. Appl. No. 12/506,137, mailed on Nov. 23, 2011, 63 pages.
Decision on Appeal for U.S. Appl. No. 10/305,823, mailed on Jul. 11, 2011, 10 pages.
Decision on Request for Rehearing for U.S. Appl. No. 10/305,823, mailed on Nov. 1, 2011, 5 pages.
Request for Reexamination of U.S. Pat. No. 7,584,301, filed Jun. 27, 2011, 36 pages.
Notice of Reexamination Request Filing Date and Notice of Assignment of Reexamination Request, mailed Jul. 6, 2011, Reexamination Control No. 90/011,765, 2 pages.
Ex Parte Interview Summary for Reexamination Control No. 90/011,765, Jul. 6, 2011, 3 pages.
Order Granting Request for Reexamination of U.S. Pat. No. 7,584,301, mailed Aug. 8, 2011, Reexamination Control No. 90/011,765, 10 pages.
Office Action in Ex Parte Reexamination for Control No. 90/011,765, mailed on Oct. 13, 2011, 7 pages.
Ex Parte Reexamination Interview Summary for Reexamination Control No. 90/011,765, mailed on Nov. 29, 2011, 57 pages.
Decision on Petition for Extension of Time in Reexamination (Granted), mailed Dec. 9, 2011, Reexamination Control No. 90/011,765, 3 pages.
Final Office Action for Reexamination Control No. 90/011,765, mailed May 16, 2012, 59 pages.
Request for Inter Partes Reexamination of U.S. Pat. No. 7,584,301, filed Nov. 8, 2011, 194 pages.
Notice of Inter Partes Reexamination Request Filing Date and Notice of Assignment of Inter Partes Reexamination Request, mailed Nov. 21, 2011, Reexamination Control No. 95/001,812, 2 pages.
Order Granting Request for Inter Partes Reexamination of U.S. Pat. No. 7,584,301 and Office Action for Reexamination Control No. 95/001,812, mailed Dec. 28, 2011, 25 pages.
Third Party Requester's Comments under 35 U.S.C. § 314(B)(2) and 37 C.F.R. § 1.947, for Reexamination Control No. 95/001,812, filed Mar. 29, 2012, 33 pages.
Action Closing Prosecution, for Reexamination Control No. 95/001,812, mailed Jun. 2, 2012, 49 pages.
Request for Reexamination of U.S. Pat. No. 7,840,678, filed Jun. 27, 2011, 25 pages.
Notice of Reexamination Request Filing Date and Notice of Assignment of Reexamination Request, mailed Jul. 1, 2011, Reexamination Control No. 90/011,763, 2 pages.
Ex Parte Interview Summary for Reexamination Control No. 90/011,763, mailed Jul. 5, 2011, 3 pages.
Order Granting Request for Reexamination of U.S. Pat. No. 7,840,678, mailed Jul. 29, 2011, Reexamination Control No. 90/011,763, 10 pages.
Office Action for Reexamination Control No. 90/011,763, mailed Oct. 4, 2011, 7 pages.
Decision on Petition for Extension of Time in Reexamination (Granted), mailed Nov. 17, 2011, Reexamination Control No. 90/011,763, 3 pages.
Ex Parte Reexamination Interview Summary for Reexamination Control No. 90/011,763, mailed on Nov. 29, 2011, 57 pages.
Final Office Action for Reexamination Control No. 90/011,763, mailed on Apr. 25, 2012, 51 pages.
Request for Inter Partes Reexamination for U.S. Pat. No. 7,840,678, mailed on Nov. 17, 2011, 164 pages.
Notice of Inter Partes Reexamination Request Filing Date and Notice of Assignment of Inter Partes Reexamination Request, mailed Nov. 23, 2011, Reexamination Control No. 95/001,822, 2 pages.
Order Granting Request for Inter Partes Reexamination of U.S. Pat. No. 7,840,678 and Office Action for Reexamination Control No. 95/001,822, mailed Jan. 12, 2012, 21 pages.
Third Party Requester's Comments under 35 U.S.C. § 314(B)(2) and 37 C.F.R. § 1.947, for Reexamination Control No. 95/001,822, filed Apr. 11, 2012, 37 pages.
Action Closing Prosecution, for Reexamination Control No. 95/001,822, mailed May 5, 2012, 45 pages.
Notice of Allowance for U.S. Appl. No. 12/938,232, mailed on Apr. 7, 2011, 51 pages.
Non-Final Office Action for U.S. Appl. No. 13/101,398, mailed on Nov. 10, 2011, 58 pages.
Final Office Action for U.S. Appl. No. 13/101,398, mailed on Jun. 11, 2012, 56 pages.
Joshi, U.S. Appl. No. 12/787,779, filed May 26, 2010.
Office Action, issued in U.S. Appl. No. 10/211,822, mailed Aug. 19, 2005.
Notice of Allowance, issued in U.S. Appl. No. 10/211,822, mailed Mar. 7, 2006.
Office Action, issued in U.S. Appl. No. 10/377,364, mailed Sep. 22, 2006.
Office Action, issued in U.S. Appl. No. 10/377,364, mailed Mar. 26, 2007.
Office Action, issued in U.S. Appl. No. 10/377,364, mailed Sep. 4, 2007.
Office Action, issued in U.S. Appl. No. 10/377,364, mailed Apr. 9, 2008.
Office Action, issued in U.S. Appl. No. 10/377,364, mailed Nov. 24, 2008.
Office Action, issued in U.S. Appl. No. 10/377,364, mailed Aug. 31, 2009.
Advisory Action, issued in U.S. Appl. No. 10/377,364, mailed Nov. 23, 2009.
Office Action, issued in U.S. Appl. No. 10/206,580, mailed Aug. 15, 2005.
Office Action, issued in U.S. Appl. No. 10/206,580, mailed Mar. 9, 2006.
Advisory Action, issued in U.S. Appl. No. 10/206,580, mailed Jun. 6, 2006.
Office Action, issued in U.S. Appl. No. 10/206,580, mailed Jul. 12, 2006.
Notice of Allowance, issued in U.S. Appl. No. 10/206,580, mailed Jan. 11, 2007.
Office Action, issued in U.S. Appl. No. 10/376,903, mailed Jul. 17, 2006.
Office Action, issued in U.S. Appl. No. 10/376,903, mailed Jan. 12, 2007.
Office Action, issued in U.S. Appl. No. 10/376,903, mailed Jun. 5, 2007.
Office Action, issued in U.S. Appl. No. 10/376,903, mailed Feb. 20, 2008.
Office Action, issued in U.S. Appl. No. 10/376,903, mailed Oct. 16, 2008.
Office Action, issued in U.S. Appl. No. 10/376,903, mailed Mar. 4, 2009.
Office Action, issued in U.S. Appl. No. 10/214,921, mailed Feb. 7, 2006.
Office Action, issued in U.S. Appl. No. 10/214,921, mailed Aug. 9, 2006.
Advisory Action, issued in U.S. Appl. No. 10/214,921, mailed Sep. 21, 2006.
Office Action, issued in U.S. Appl. No. 10/214,921, mailed Dec. 7, 2006.
Office Action, issued in U.S. Appl. No. 10/214,921, mailed Aug. 13, 2007.
Office Action, issued in U.S. Appl. No. 10/214,921, mailed Nov. 15, 2007.
Office Action, issued in U.S. Appl. No. 10/214,921, mailed Jun. 12, 2008.
Office Action, issued in U.S. Appl. No. 10/214,921, mailed Oct. 6, 2008.
Notice of Allowance, issued in U.S. Appl. No. 10/214,921, mailed Apr. 3, 2009.
Office Action, issued in U.S. Appl. No. 10/305,823, mailed Jan. 12, 2006.

(56) References Cited

OTHER PUBLICATIONS

Office Action, issued in U.S. Appl. No. 10/305,823, mailed Jul. 3, 2006.
Office Action, issued in U.S. Appl. No. 10/305,823, mailed Jan. 3, 2007.
Office Action, issued in U.S. Appl. No. 10/305,823, mailed Sep. 10, 2007.
Office Action, issued in U.S. Appl. No. 10/305,823, mailed Mar. 24, 2008.
Advisory Action, issued in U.S. Appl. No. 10/305,823, mailed Jul. 9, 2008.
Examiner's Answer, issued in U.S. Appl. No. 10/305,823, mailed Mar. 4, 2009.
Supplemental Examiner's Answer, issued in U.S. Appl. No. 10/305,823, mailed Apr. 13, 2009.
Office Action, issued in U.S. Appl. No. 12/272,618, mailed Sep. 29, 2009.
Notice of Allowance, issued in U.S. Appl. No. 10/206,580, mailed Jul. 6, 2007.
Notice of Allowance, issued in U.S. Appl. No. 10/376,903, mailed Oct. 19, 2009.
Office Action, issued in U.S. Appl. No. 12/177,021, mailed Aug. 12, 2010.
Office Action, issued in U.S. Appl. No. 10/840,496, mailed Oct. 18, 2007.
Notice of Allowance, issued in U.S. Appl. No. 10/839,919, mailed May 14, 2009.
Office Action, issued in U.S. Appl. No. 10/839,919, mailed Dec. 9, 2008.
Notice of Allowance, issued in U.S. Appl. No. 10/839,919, mailed Mar. 5, 2008.
Office Action, issued in U.S. Appl. No. 10/839,919, mailed Jun. 18, 2008.
Office Action, issued in U.S. Appl. No. 10/840,496, mailed Aug. 1, 2008.
Notice of Allowance, issued in U.S. Appl. No. 10/840,496, mailed Oct. 15, 2008.
Office Action, issued in U.S. Appl. No. 12/353,701, mailed Jun. 4, 2009.
Office Action, issued in U.S. Appl. No. 10/924,552, mailed Feb. 27, 2008.
Notice of Allowance, issued in U.S. Appl. No. 10/924,552, mailed May 30, 2008.
Office Action, issued in U.S. Appl. No. 09/670,487, mailed Dec. 31, 2003.
Office Action, issued in U.S. Appl. No. 09/670,487, mailed Sep. 21, 2004.
Office Action, issued in U.S. Appl. No. 09/670,487, mailed Mar. 15, 2005.
Office Action, issued in U.S. Appl. No. 09/670,487, mailed Nov. 3, 2005.
Office Action, issued in U.S. Appl. No. 09/670,487, mailed May 3, 2006.
Office Action, issued in U.S. Appl. No. 09/670,487, mailed Nov. 17, 2006.
Office Action, issued in U.S. Appl. No. 09/670,487, mailed Oct. 30, 2007.
Office Action, issued in U.S. Appl. No. 09/670,487, mailed Jul. 22, 2008.
Notice of Allowance, issued in U.S. Appl. No. 09/670,487, mailed Sep. 18, 2008.
Office Action, issued in U.S. Appl. No. 11/741,480, mailed Nov. 27, 2007.
Office Action, issued in U.S. Appl. No. 11/741,480, mailed Apr. 29, 2008.
Office Action, issued in U.S. Appl. No. 11/741,480, mailed Oct. 31, 2008.
Notice of Allowance, issued in U.S. Appl. No. 11/741,480, mailed Apr. 10, 2009.
Office Action, issued in U.S. Appl. No. 11/707,697, mailed Mar. 3, 2009.
Office Action, issued in U.S. Appl. No. 11/707,697, mailed Sep. 17, 2009.
Notice of Allowance, issued in U.S. Appl. No. 10/377,364, mailed Jan. 12, 2010.
Office Action, issued in U.S. Appl. No. 11/707,697, mailed Jan. 12, 2010.
Notice of Allowance, issued in U.S. Appl. No. 12/353,701, mailed Apr. 9, 2010.
Office Action, issued in U.S. Appl. No. 12/177,021, mailed Jan. 29, 2010.
Office Action, issued in U.S. Appl. No. 12/272,618, mailed Feb. 4, 2010.
F5 Networks, Inc., "Keeping Up with Multi-Service Applications," A F5 Networks, Inc. White Paper Document, Jan. 2006, 8 pages, Seattle, WA.
Citrix Systems, Inc., "NetScaler Global Server Load Balancing for Presentation Server and Access Gateway (All Editions) Deployments," Design Consideration NetScaler 8.0, 2007, 16 pages, Fort Lauderdale, FL.
F5 Networks, Inc., "Optimize Application Delivery Across Your Globally Distributed Data Centers," BIG-IP Global Traffic Manager Datasheet, 2009, 8 pages, Seattle WA.
Stalvig P., "Disaster Recovery: Not Just Planning for the Worst," A F5 Networks, Inc. White Paper Document, 2008, 16 pages, F5 Networks, Inc., Seattle, WA.
Cisco Systems, Inc., "The Global Server Load Balancing Primer," A Cisco Systems, Inc. White Paper Document, 1992-2004, 20 pages, San Jose, CA.
Civil Action 10-332, Complaint for Patent Infringement with Exhibits A-G, filed on Apr. 23, 2010, 131 pages.
Civil Action 10-332, Second Amended and Supplemental Complaint for Patent Infringement with Exhibits H-I, filed on Jul. 16, 2010, 41 pages.
Civil Action CV10-03443, Complaint for Declaratory Judgment with Exhibits A-I, filed on Aug. 6, 2010, 153 pages.
Notice of Allowance for U.S. Appl. No. 12/506,130, mailed on Oct. 12, 2010, 49 pages.
Non-Final Office Action for U.S. Appl. No. 12/635,371, mailed on Oct. 7, 2010, 44 pages.
Non-Final Office Action for U.S. Appl. No. 12/506,137, mailed on Oct. 7, 2010, 26 pages.
Devarapalli et al., U.S. Appl. No. 61/393,796, filed Oct. 15, 2010.
Devarapalli et al., U.S. Appl. No. 12/916,390, filed Oct. 29, 2010.
Joshi, U.S. Appl. No. 12/938,232, filed Nov. 2, 2010.
Network Working Group, Request for Comments (RFC) 4033, "DNS Security Introduction and Requirements," Mar. 2005, 22 pages.
Network Working Group, Request for Comments (RFC) 4034, "Resource Records for the DNS Security Extensions," Mar. 2005, 31 pages.
Network Working Group, Request for Comments (RFC) 4035, "Protocol Modifications for the DNS Security Extensions," Mar. 2005, 55 pages.
National Institute of Standards and Technology (NIST), "Secure Domain Name System (DNS) Deployment Guide," Special Publication 800-81, May 2006, 103 pages.
CMP Media LLC, "VeriSign DNSSEC Interop Lab Adds Brocade, A10 Networks, BlueCat Networks," Jun. 29, 2010, can be retrieved from http://www.darkreading.com/story/showArticIle.jhtml?articleID=225701776, 3 pages.
Meyer, Nathan et al., "F5 and Infoblox DNS Integrated Architecture: Offering a Complete Scalable, Secure DNS Solution," a F5 Networks, Inc. Technical Brief, 2010, 18 pages, Seattle, WA.
Silva, Peter, "DNSSEC: The Antidote to DNS Cache Poisoning and Other DNS Attacks," A F5 Networks, Inc. Technical Brief, 2009, 10 pages, Seattle, WA.
Wikimedia Foundation, Inc., "Domain Name Security Extensions," retrieved Oct. 22, 2010, from http://en.wikipedia.org/wiki/Domain_Name_System_Security_Extensions, 17 pages.
Al0 Networks, Inc., "A10 Networks Announces Unique and Wide Ranging Customer-Driven Functionality for AX Series Application

(56) References Cited

OTHER PUBLICATIONS

Delivery Controllers," News Release, Oct. 18, 2010, from http://www.a10networks.com/news/2010/101018-AX_Series_2.6.php, 2 pages.
Civil Action 10-332, Report on the Filing or Determination of an Action Regarding a Patent or Trademark, filed on Aug. 5, 2010, 2 pages.
Civil Action 10-332, Notice of Voluntary Dismissal Without Prejudice, filed on Aug. 5, 2010, 2 pages.
Civil Action CV10-03428, Complaint for Patent Infringement, Trade Secret Misappropriation, Breach of Contract, Interference with Prospective Economic Advantage, Interference with Contract, and Unfair Competition Under Cal. Bus. & Prof. Code §§ 17200 et seq., filed on Aug. 4, 2010, with Exhibits A-M, 196 pages.
Civil Action CV10-03428, First Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., filed on Oct. 29, 2010, 38 pages.
Non-Final Office Action for U.S. Appl. No. 12/496,560, mailed on Sep. 17, 2010, 27 pages.
Final Office Action for U.S. Appl. No. 12/272,618, mailed on Nov. 26, 2010, 19 pages.
Request for Reexamination of U.S. Pat. No. 7,756,965, filed Jun. 27, 2011, 38 pages.
Notice of Reexamination Request Filing Date and Notice of Assignment of Reexamination Request, mailed Jun. 30, 2011, Reexamination Control No. 90/011,761, 2 pages.
Ex Parte Interview Summary for Reexamination Control No. 90/011,761, mailed Jul. 6, 2011, 3 pages.
Order Granting Request for Reexamination of U.S. Pat. No. 7,756,965, mailed Aug. 19, 2011, Reexamination Control No. 90/011,761, 9 pages.
Office Action for Reexamination Control No. 90/011,761, mailed Nov. 18, 2011, 12 pages.
Decision on Petition for Extension of Time in Reexamination (Granted), mailed Jan. 3, 2012, Reexamination Control No. 90/011,761, 3 pages.
Final Office Action with Interview Summary for Reexamination Control No. 90/011,761, mailed on Mar. 26, 2012, 17 pages.
Advisory Action for Reexamination Control No. 90/011,761, mailed on Jul. 17, 2012, 11 pages.
Notification of Non-Compliant Appeal Brief, for Reexamination Control No. 90/011,761, mailed on Oct. 24, 2012, 4 pages.
Request for Inter Partes Reexamination for U.S. Pat. No. 7,756,965 B1, filed Nov. 18, 2011, 189 pages.
Notice of Inter Partes Reexamination Request Filing Date and Notice of Assignment of Inter Partes Reexamination Request, mailed Dec. 1, 2011, Reexamination Control No. 95/001,827, 2 pages.
Order Granting Request for Inter Partes Reexamination of U.S. Pat. No. 7,756,965 and Office Action, mailed Feb. 13, 2012, Reexamination Control No. 95/001,827, 18 pages.
Decision on Petition for Extension of Time in Reexamination (Granted), mailed Mar. 30, 2012, Reexamination Control No. 95/001,827, 3 pages.
Third Party Requester's Comments under 35 U.S.C. § 314(B)(2) and 37 C.F.R. § 1.947, for Reexamination Control No. 95/001,827, filed Jun. 13, 2012, 40 pages.
Third Party Requester's Refiling of Certificate of Service for Requester Comments, for Reexamination Control No. 95/001,827, filed Jun. 21, 2012, 3 pages.
Third Party Requester's Opposition to Petition to Refuse Entry of Requester's Comments, for Reexamination Control No. 95/001,827, filed Jul. 12, 2012, 5 pages.
Decision Dismissing Petitions, for Reexamination Control No. 95/001,827, mailed Aug. 22, 2012, 5 pages.

Notice of Allowance for U.S. Appl. No. 12/787,779, mailed Dec. 20, 2010, 45 pages.
Notice of Allowance for U.S. Appl. No. 12/787,779, mailed Jan. 12, 2011, 48 pages.
Request for Reexamination of U.S. Pat. No. 7,899,899, filed Jun. 27, 2011, 24 pages.
Notice of Reexamination Request Filing Date and Notice of Assignment of Reexamination Request, mailed Jul. 8, 2011, Reexamination Control No. 90/011,760, 2 pages.
Ex Parte Interview Summary for Reexamination Control No. 90/011,760, mailed Jul. 18, 2011, 3 pages.
Order Granting Request for Reexamination of U.S. Pat. No. 7,899,899, mailed Aug. 19, 2011, Reexamination Control No. 90/011,760, 9 pages.
Office Action for Reexamination Control No. 90/011,760, mailed Nov. 18, 2011, 8 pages.
Decision on Petition for Extension of Time in Reexamination (Granted), mailed Jan. 5, 2012, Reexamination Control No. 90/011,760, 3 pages.
Final Office Action and Interview Summary for Reexamination Control No. 90/011,760, mailed Mar. 21, 2012, 14 pages.
Advisory Action for Reexamination Control No. 90/011,760, mailed Jul. 17, 2012, 10 pages.
Request for Inter Partes Reexamination for U.S. Pat. No. 7,899,899 B1, filed Nov. 18, 2011, 153 pages.
Notice of Inter Partes Reexamination Request Filing Date and Notice of Assignment of Inter Partes Reexamination Request, mailed Nov. 29, 2011, Reexamination Control No. 95/001,826, 2 pages.
Order Granting Request for Inter Partes Reexamination of U.S. Pat. No. 7,899,899 and Office Action for Reexamination Control No. 95/001,826, mailed Feb. 7, 2012, 19 pages.
Decision on Petition for Extension of Time in Reexamination (Granted), mailed Apr. 4, 2012, Reexamination Control No. 95/001,826, 3 pages.
Third Party Requester's Comments under 35 U.S.C. § 314(B)(2) and 37 C.F.R. § 1.947, for Reexamination Control No. 95/001,826, filed Jun. 6, 2012, 46 pages.
Third Party Requester's Refiling of Certificate of Service for Requester Comments, for Reexamination Control No. 95/001,826, filed Jun. 21, 2012, 3 pages.
Third Party Requester's Opposition to Petition to Refuse Entry of Requester's Comments, for Reexamination Control No. 95/001,826, filed Jul. 12, 2012, 5 pages.
Decision Dismissing Petitions, for Reexamination Control No. 95/001,826, mailed Aug. 22, 2012, 5 pages.
Non-Final Office Action for U.S. Appl. No. 13/023,292, mailed Jul. 8, 2011, 6 pages.
Notice of Allowance for U.S. Appl. No. 13/023,292, mailed Feb. 13, 2012, 85 pages.
Office Communication for U.S. Appl. No. 13/023,292, mailed Feb. 23, 2012, 11 pages.
Notice of Allowance for U.S. Appl. No. 13/023,292, mailed May 18, 2012, 25 pages.
Notice of Allowance for U.S. Appl. No. 13/023,292, mailed Jun. 4, 2012, 22 pages.
Office Communication for U.S. Appl. No. 13/023,292, mailed Jul. 2, 2012, 7 pages.
Office Communication for U.S. Appl. No. 13/023,292, mailed Aug. 24, 2012, 8 pages.
Non-Final Office Action for U.S. Appl. No. 13/595,952, mailed Nov. 13, 2012, 121 pages.
Non-Final Office Action for U.S. Appl. No. 10/924,552, Mailed Feb. 27, 2008, 14 pages.
Notice of Allowance for U.S. Appl. No. 10/924,552, Mailed May 30, 2008, 18 pages.
Non-Final Office Action for U.S. Appl. No. 12/177,021, mailed Jan. 29, 2010, 8 pages.
Final Office Action for U.S. Appl. No. 12/177,021, mailed Aug. 12, 2010, 20 pages.
Notice of Allowance for U.S. Appl. No. 12/177,021, mailed Dec. 10, 2010, 20 pages.

(56) References Cited

OTHER PUBLICATIONS

Non-Final Office Action for U.S. Appl. No. 13/008,321, mailed Nov. 20, 2012, 95 pages.
Non-Final Office Action for U.S. Appl. No. 12/916,390, mailed on Jul. 30, 2012, 45 pages.
Civil Action CV10-03428, Transcript of the Deposition of Kevin Delgadillo, taken Mar. 14, 2012, 12 pages.
Delgadillo, K., "Cisco DistributedDirector," posted Apr. 12, 1999, submitted as Exhibit 2 in *Brocade Communications Systems, Inc.* v. *A10 Networks, Inc.*, Civil Action CV10-03428, Mar. 21, 2012, 27 pages.
Delgadillo, K., "Cisco DistributedDirector," 1999, submitted as Exhibit 3 in *Brocade Communications Systems, Inc.* v. *A10 Networks, Inc.*, Civil Action CV10-03428, Mar. 21, 2012, 20 pages.
Declaration of James E. Mrose, entered as Exhibit Q in *Brocade Communications Systems, Inc.* v. *A10 Networks, Inc.*, Civil Action CV10- 03428, Mar. 21, 2012, 4 pages.
Information Disclosure Statement, filed Jul. 27, 1999 in the prosecution of U.S. Appl. No. 09/294,837, submitted as Exhibit A to the Mrose Declaration, 7 pages.
S. Ariyapperuma et al., "Security Vulnerabilities in DNS and DNSSEC," Second International Conference on Availability, Reliability and Security (ARES '07), Apr. 2007, 8 pages.
Cisco Systems, Inc., "Configuring a DRP Server Agent," Jul. 6, 1999 (updated Oct. 11, 2006), 20 pages.
Venkataramani, Arun et al., "A mechanism for background transfers", Proceedings of the fifth symposium an operating systems design and implementation (OSDI'02), 2002, ISBN: 1-931971-06-4, Publisher: USENIX Assoc, Berkeley, CA, USA, Laboratory of Advanced Systems Research, Department of Computer Science, 19 pages.
Office Action dated Sep. 30, 2015, issued in U.S. Appl. No. 121506,137.
Office Action dated Feb. 18, 2015, issued in U.S. Appl. No. 10/305,823.
Notice of Allowance dated Mar. 2, 2015, issued in U.S. Appl. No. 12/635,371.
Office Action dated May 13, 2015, issued in U.S. Appl. No. 10/305,823.
Notice of Allowance dated Jun. 26, 2015, issued in U.S. Appl. No. 10/305,823.
Office Action dated Jun. 16, 2015, issued in U.S. Appl. No. 14/248,247.

\* cited by examiner

GLOBAL SERVER LOAD BALANCING SUPPORT FOR PRIVATE VIP ADDRESSES

BACKGROUND OF THE INVENTION

Field of the Invention

This disclosure relates generally to load balancing among servers. More particularly but not exclusively, the present disclosure relates to providing network components with capability to detect mapping between public and private addresses and to provide the public addresses for use in load balancing.

Description of the Related Art

Under the Transmission Control Protocol/Internet Protocol (TCP/IP), when a client provides a symbolic name (a Uniform Resource Locator or URL) to request access to an application program or another type of resource, the host name portion of the URL needs to be resolved into an IP address of a server for that application program or resource. For example, the URL (e.g., http colon double-slash dub-dub-dub dot foundrynet dotcom slash index dot htm) includes a host name portion dub-dub-dub dot foundrynet dotcom that needs to be resolved into an IP address. The host name portion is first provided by the client to a local name resolver, which then queries a local Domain Name System (DNS) server to obtain a corresponding IP address. If a corresponding IP address is not locally cached at the time of the query, or if the time-to-live (TTL) of a corresponding IP address cached locally has expired, the DNS server then acts as a resolver and dispatches a recursive query to another DNS server. This process is repeated until an authoritative DNS server for the domain (e.g., foundrynet dotcom, in this example) is reached. The authoritative DNS server returns one or more IP addresses, each corresponding to an address at which a server hosting the application ("host server") under the host name can be reached. These IP addresses are propagated back via the local DNS server to the original resolver. The application at the client then uses one of the IP addresses to establish a TCP connection with the corresponding host server. Each DNS server caches the list of IP addresses received from the authoritative DNS server for responding to future queries regarding the same host name, until the TTL of the IP addresses expires.

To provide some load sharing among the host servers, global server load balancing GSLB) switches are sometimes used as proxies for authoritative DNS servers, together with one or more site switches each associated with one or more host servers. Each site switch provides the GSLB switch with current site-specific information ("metrics") regarding access conditions to the host servers associated with the site switches. The GSLB switch then processes the addresses returned by the DNS server using the metrics compiled from the site switches and provides an ordered address list having the optimum address for access listed at the top. An example of a GSLB system and description of associated metrics are disclosed in U.S. application Ser. No. 10/376,903, entitled "GLOBAL SERVER LOAD BALANCING," filed Feb. 28, 2003, assigned to the same assignee as the present application, and which is incorporated herein by reference in its entirety.

An increasingly common feature of networks with internal and external connections is the mapping of private (internal) server addresses to public (external) addresses via a mapping device, such a firewall or Network Address Translation (NAT) device. Another frequent characteristic of such networks is the use of virtual IP addresses (VIPs) in addition to real server addresses. A VIP can have either or both a private address and a public address. The authoritative DNS server for which a GSLB switch is being used as a proxy for the specified domains is typically configured with the public addresses for these domains, so that the GSLB switch can reorder these public addresses returned in the authoritative DNS server reply as part of the GSLB algorithm when a client requests access to any of the specified domains. In addition to having a GSLB switch communicate directly with site switches to obtain metrics information from the site switches, the GSLB switch also receives from the site switches a list of VIPs configured on the site switches. If these VIPs are private IP addresses mapped to public IP addresses by a device such as a firewall or NAT device, then the site switch is unaware of the mapping and only communicates the private VIP addresses to the GSLB switch. However, since the authoritative DNS server is configured with the public addresses rather than with the private addresses, the public VIP addresses received in the DNS reply do not match the private VIP address on the GSLB switch and are treated as real addresses by the GSLB switch rather than as virtual addresses. Since most of the metrics are applicable only to virtual addresses and not to real addresses, the GSLB switch cannot apply many of the metrics to the received private address, thereby reducing the overall efficiency or accuracy of the load balancing system.

As a further elaboration, a VIP having a private IP address is configured on a site switch. The site switch would know the private IP address associated with that VIP, but would not know the public IP address mapped to that private IP address by a mapping device (such as a firewall device). As a result, the site switch would communicate only the private IP address (and its associated metrics information) rather than the public IP address to the peer GSLB switch. Meanwhile, the authoritative DNS server (for which the peer GSLB switch is serving as a proxy and for which the GSLB switch is handling load balancing for the site having the VIP) has been configured with only the public IP address for the VIP for that site. Accordingly, when the GSLB switch receives the DNS reply from the authoritative DNS server, the GSLB switch would not recognize the public IP address in the DNS reply as being a VIP at that site, since the GSLB switch is only aware of the private IP address of the VIP received from the site switch. The GSLB switch therefore treats the received public IP address as a real address, since the private IP address is different from the public IP address in the DNS reply being reordered by the GSLB switch. Accordingly, the GSLB switch would not apply (or would incorrectly apply) some of the metrics, such as the active bindings metric (where the best IP address is the VIP that has the maximum number of active real servers bound to it), which are usable only with virtual addresses. Had the GSLB switch been able to correctly identify the received address as being a VIP, the GSLB would have been able to apply the correct metric(s) for VIPs when reordering the reply from the authoritative DNS server for which it is serving as a proxy.

BRIEF SUMMARY OF THE INVENTION

One aspect of the present invention provides a method that includes obtaining information related to a mapping between first and second addresses associated with a network resource. The method sends the mapping information to a load balancing device to allow the load balancing device to load balance traffic to the network resource using at least one metric associated with the second address and the mapping information.

The present invention is better understood upon consideration of the detailed description of the embodiments below, in conjunction with the accompanying drawings.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
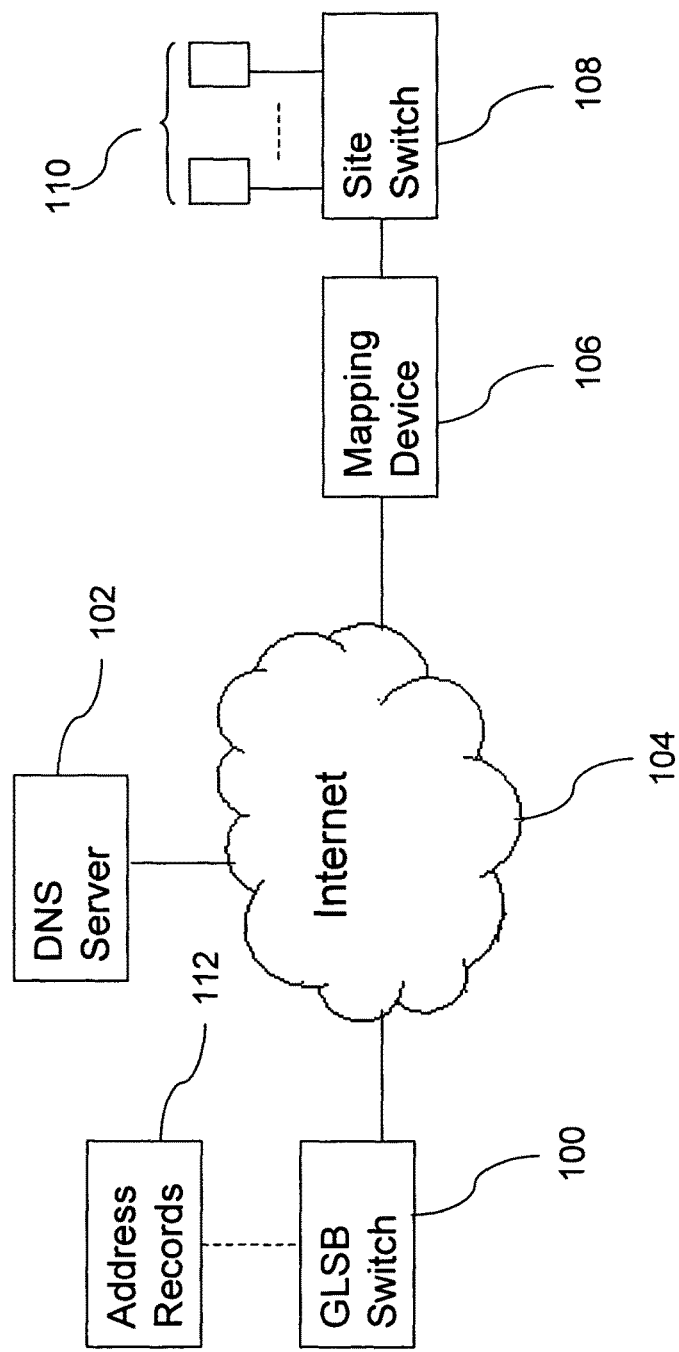
FIG. 1 illustrates a GSLB system in which an embodiment of the invention may be implemented.

Embodiments of techniques to provide GSLB support for private VIPs are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, one embodiment of the present invention provides GSLB support for private VIPs. According to this embodiment, an authoritative DNS server, for which a GSLB switch is serving as a proxy, is configured with public IP addresses for a domain that the GSLB switch load balances. A site switch for the GSLB switch is configured with one or more private address of a VIP of the domain, with the site switch providing metrics information to the GSLB switch as part of the load balancing process. A mapping device maps the private addresses of the VIP to the public IP addresses.

The site switch obtains the mapping information from the mapping device, thereby being able to identify the public IP address of the VIP. The site switch then communicates all of the VIPs, configured on the site switch, to the GSLB switch. Because the site switch has identified the public IP address that is mapped to the private IP address configured on the site switch, the communication of the VIPs from site switch to the GSLB switch includes the public IP address instead of the private IP address. The GSLB switch receives the public IP address of the VIP from the site switch. The GSLB switch updates an address list/records it maintains for the site switch with the public IP addresses of the VIP. As a result, when the GSLB switch reorders the DNS reply from the authoritative DNS server, the GSLB switch references the address list and correctly identifies the IP address in the reply as a VIP on the site switch, since the IP address configured for the domain on the authoritative DNS server as well as that learned by the GSLB switch from the site switch now is the public IP address of the VIP. The GSLB switch is now able to apply the appropriate VIP-related metrics accurately to reorder the DNS reply to send to a requesting client.

According to various implementations, the site switch can be configured "for peer only" or "for self and peer." With the "for peer only" configuration, a GSLB controller on the site switch continues to use private IP addresses if the site switch also performs GSLB for the local site. With the "for self and peer" configuration, the site switch communicates the public IP addresses to a peer GSLB switch as well as to a local GSLB controller if the site switch is also functioning as a GSLB switch, thereby allowing the local GSLB controller of the site switch to accurately apply VIP-related metrics to load balance traffic.

FIG. 1 shows one example of a global server load balancing arrangement in which an embodiment of the invention may be implemented. As shown in FIG. 1, a remote (peer) GLSB switch 100 is connected to an Internet 104 and acts as proxy to an authoritative DNS server 102 for a network represented by the domain "foo dotcom" (for example). While the DNS server 102 provides the actual DNS service for the domain, the IP address known to the rest of the Internet 104 for the authoritative DNS server 102 is a VIP address configured on the GSLB switch 100. The DNS server 102 is also configured with the IP addresses for the domain foo dotcom, and the GSLB switch 100 is configured as a proxy for the domain foo dotcom. The GSLB switch 100 forwards client queries to the DNS server 102, and reorders the IP address list received from the authoritative DNS server 102 and sends the reordered IP address list in response to queries from clients requesting access to foo dotcom.

The network represented by the domain name foo dotcom has two components, for the purpose of describing an embodiment of this invention, in addition to other sub-parts. These components are a mapping device 106 and at least one site switch 108 (or other network device, such as a router). The mapping device 106 translates internal (private) addresses of real and virtual servers on the network to external (public) addresses. NAT or firewall devices are typical examples of such mapping devices 106.

The site switch 108 is coupled to an internal side of the mapping device 106. In addition to other tasks, the site switch 108 collects information about real and/or virtual servers 110 on the network and communicates with the GSLB switch 100. In particular, the site switch 108 has one or more VIPs configured on it, and communicates to the GSLB switch 100 that it has these VIPs via a protocol exchange. This protocol exchange is also used to communicate VIP-related metrics information collected by the site switch 108 to the GSLB switch 100.

In a global server load balancing application, the GSLB switch 100, acting as a proxy to the authoritative DNS server 102, receives a query from a client on the Internet 104 in the form of a URL that requests access to the domain foo dotcom, for example. The authoritative DNS server 102 provides a list of addresses to the GSLB switch 100 that corresponds to the domain foo dotcom. The GSLB switch 100 also gets metrics information along with a list of VIPs configured on the site switch 108 from the site switch 108. Using the metrics information, the GSLB switch 100 reorders the list of addresses received from the authoritative DNS server 102 to place the optimum address at the top. For purposes of brevity, details of global server load balancing and performance metrics for load balancing will not be described in further detail herein, and instead are disclosed in U.S. application Ser. No. 10/305,823, entitled "DISTRIBUTED HEALTH CHECK FOR GLOBAL SERVER LOAD BALANCING", filed Nov. 27, 2002; U.S. application Ser. No. 10/376,903, entitled "GLOBAL SERVER LOAD BALANCING", filed Feb. 28, 2003; and in U.S. application Ser. No. 10/211,822, entitled "STATISTICAL TRACKING FOR GLOBAL SERVER LOAD BALANCING", filed Aug. 1, 2002. All applications are assigned to the same assignee as the present application and incorporated herein by reference in their entirety.

In accordance with embodiments of the invention that will be described further below, the site switch 108 obtains mapping information between public and private IP addresses on the network from the mapping device 106 and then communicates the VIPs configured on the site switch 108 to the GSLB switch 100, with the communication including the public IP address of the VIP rather than its private IP address. The GSLB switch 100 can then responsively update its address records 112 (e.g., a VIP list that the GSLB switch 100 maintains for the site switch 108) with the public IP address of the VIP. This public IP address of the VIP is also configured for the domain foo dotcom on the DNS server 102. The DNS server 102 returns a list of IP addresses, also containing the public IP address of the VIP, to the GSLB switch 100. The GSLB switch 100 refers to its address records 112 and correctly identifies the public IP address as a VIP on the site switch 108. Thus, the GSLB switch 100 can reorder the list of addresses received from the authoritative DNS server 102 based on the VIP-related metrics information and/or other metrics information provided by the site switch 108.

Figure 2:
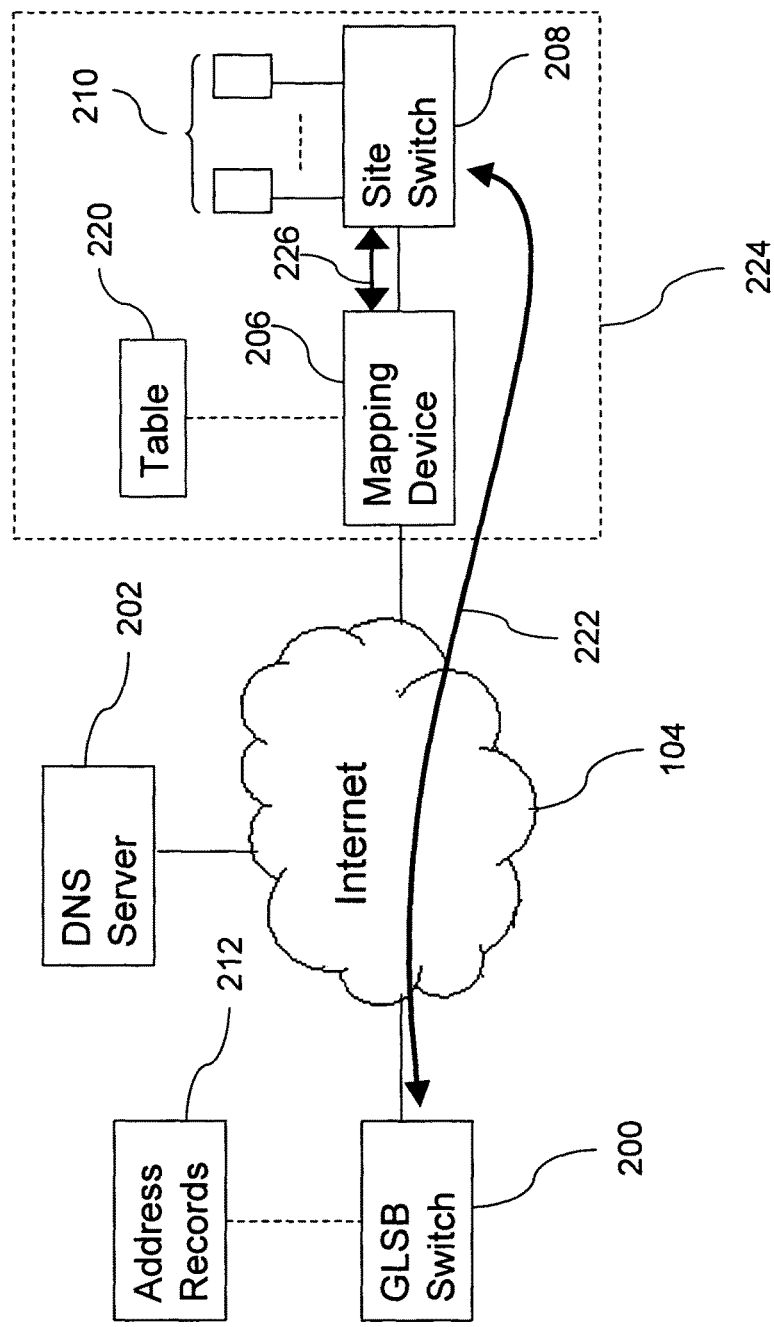
FIG. 2 illustrates a GSLB system according to one embodiment of the invention with a remote load balancing arrangement.
Figure 3:
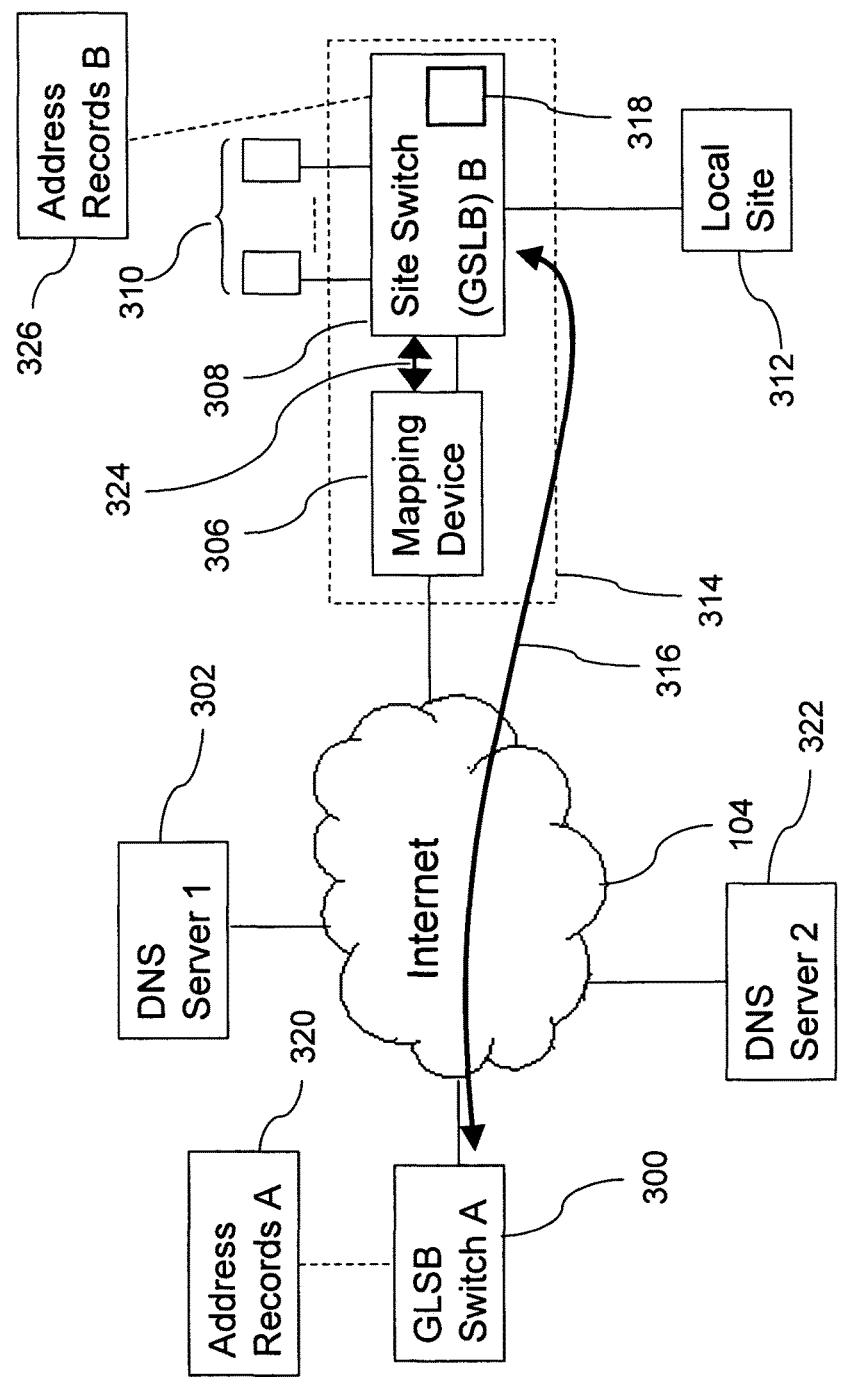
FIG. 3 illustrates a GSLB system according to another embodiment of the invention with a combination of remote and local load balancing arrangement.
Figure 4:
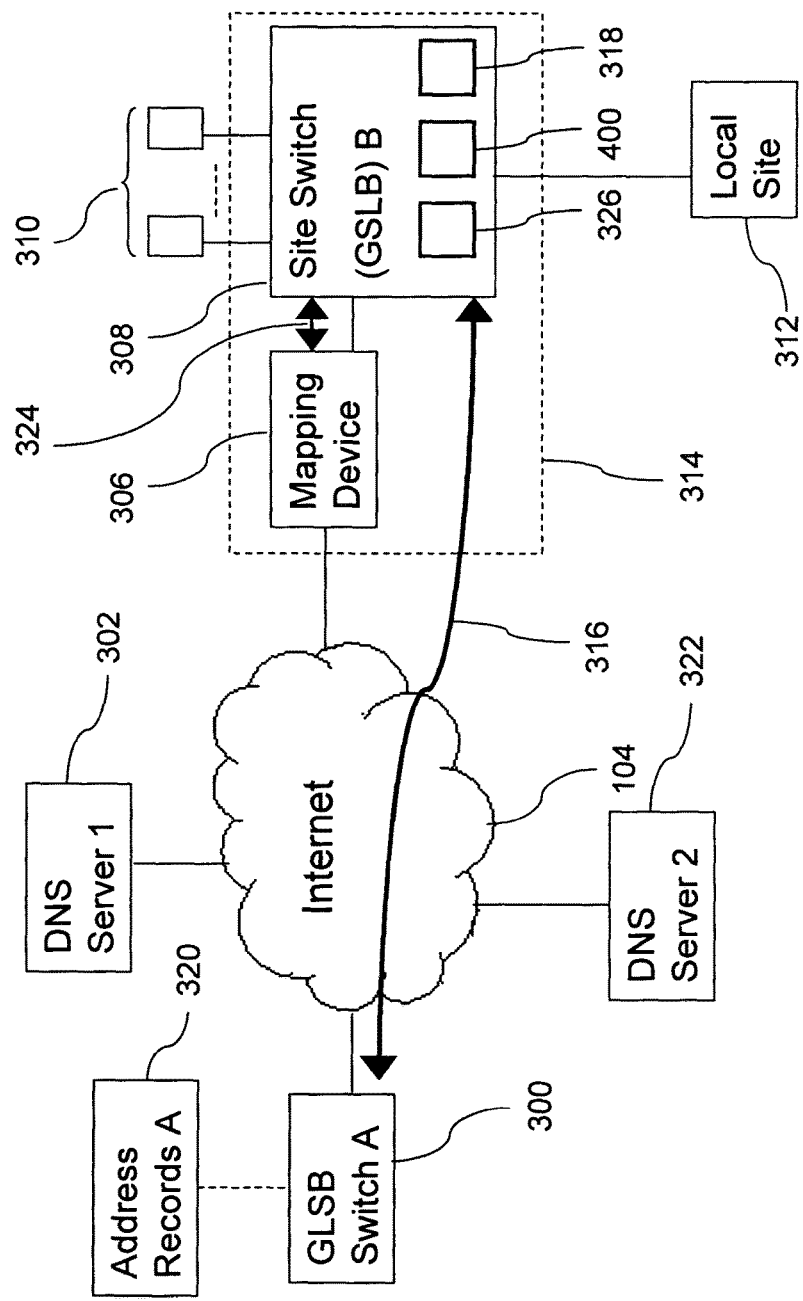
FIG. 4 illustrates a GSLB system according to yet another embodiment of the invention with a combination of remote and local load balancing arrangement.

Examples of suitable topographies for load balancing with private VIP support include, but are not limited to, the following three arrangements in FIGS. 2-4. FIG. 2 is a block diagram of a remote GSLB arrangement according to an embodiment of the invention. In this arrangement, a site switch 208 has no associated local GSLB sites and does not function as a GSLB switch itself (e.g., the site switch 208 has no local GSLB controller or metric collector). The site switch 208 operates as the remote site switch for a GSLB switch 200 (which load balances traffic to a network 224), and the GSLB switch 200 has no local site configured. Servers 210 have real IP addresses, and can have private VIP addresses configured on the site switch 208.

The network 224 can have a variety of mapping device arrangements. No mapping device, a mapping device integrated with the site switch 208, or an external mapping device connected to the site switch 208 are some of the examples. A mapping device 206 is shown in FIG. 2, which may be a firewall, NAT, or other device that maps or otherwise allocates public IP addresses to the private IP addresses configured on the site switch 208. The mapping information can be stored in one or more tables 220 or other data structure accessible by the site switch 208 in one embodiment.

There are several techniques that may be employed to allow the site switch 208 to obtain the mapping between the private and public IP addresses. In one embodiment, the mapping can be obtained via user configuration information. In this embodiment, a user can explicitly configure (such as via programming) the site switch 208 with the particulars of the mapping between the public IP addresses and the private IP addresses. In another embodiment, the mapping device 206 is integrated with the site switch 208, and the site switch 208 can directly obtain the mapping information from the table 220 (internal) or other entity that is maintained with the allocation of public IP addresses to private IP addresses. In yet another embodiment, the site switch 208 can obtain the mapping information through a message communication 226 with the mapping device 206, if the mapping device 206 is external to the site switch 208. The message communication 226 can be unidirectional or bi-directional movement of data between the site switch 208 and mapping device 206.

Then, the site switch 208 provides the obtained public IP addresses for the VIPs configured on it to the GSLB switch 200 that handles the remote load balancing for that particular network 224. According to one embodiment, the public IP addresses are provided to the GSLB switch 200 via a protocol message communication 222, along with related metrics information, instead of the private IP addresses. Alternatively or in addition in another embodiment, the information provided via the message communication 222 includes information indicative of the mapping between the public and private IP addresses, rather than solely the public IP addresses.

Figure 5:
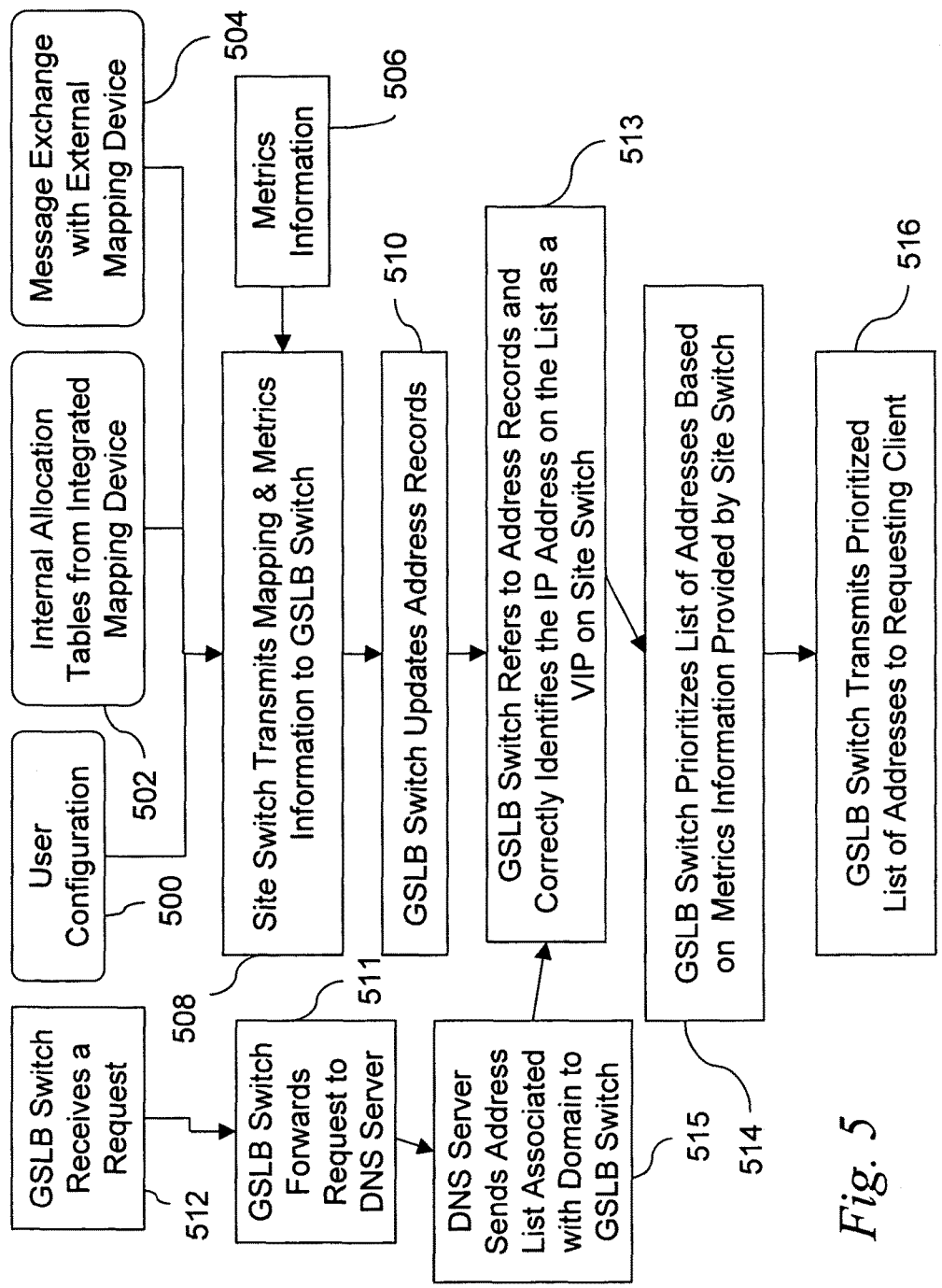
FIG. 5 is a flowchart of a GSLB process to provide public addresses according to an embodiment of the invention for a remote load balancing arrangement.

A specific example is now provided with regards to operation of the arrangement of FIG. 2. Also provided to assist in explaining the operation is FIG. 5, which is a flowchart of a GSLB process to provide public addresses according to an embodiment of the invention for the remote load balancing arrangement of FIG. 2. At least some components of the flowcharts depicted herein may be embodied in software or other machine-readable instructions stored on one or more machine-readable media. Such machine-readable media may be at a site switch, at a remote GSLB switch, or at other locations or combinations thereof. The various operations represented in the flowchart need not necessarily occur in the exact order depicted and some operations can be eliminated, added, or combined.

Initially in this example, the user configures a VIP 192.168.10.1 on the site switch 208. The VIP address 192.168.10.1 is a private IP address. The IP addresses (public) for a domain dub-dub-dub dot gslb dotcom are 207.95.55.23 and 253.72.96.55, and which are configured on the DNS server 202. The GSLB switch 200 is serving as a proxy to the DNS server 202 and is providing GSLB for the domain dub-dub-dub dot gslb dotcom.

The mapping device 206 maps the private IP address 192.168.10.1of the VIP to one of the public IP addresses 207.95.55.23 (for example). The operations of FIG. 5 begin with examples of different ways of providing mapping information to the site switch 208. Mapping information between the public and private IP addresses can be obtained by the site switch 208 via user configuration at a block 500, via access to internal allocation tables of an integrated mapping device at a block 502, via message communication with an external mapping device at a block 504, or via some other technique. Should the mapping information change at any time, the site switch 208 can re-learn the mapping. In addition to the mapping information (e.g., the public IP addresses), the site switch 208 also collects related metrics information at a block 506.

The site switch 208 is configured "for peer only" in this example, since the site switch 208 does not function as a GSLB controller/collector and does not have a local GSLB site configured. Therefore, the site switch 208 will be sending public IP addresses to the peer GSLB switch 200 only, to allow the peer GSLB switch 200 to perform load balancing accurately for the domain dub-dub-dub dot gslb dotcom, rather than also sending public IP addresses to its internal GSLB components (which it does not have or are not enabled). The site switch 208, having obtained the mapping and metrics information, transmits that information to the GSLB switch 200 at a block 508. More specifically, the site switch 208 notifies the GSLB switch 200 that it has a VIP 207.95.55.23 configured on it. The GSLB switch 200 maintains a list (e.g., address records 212) of VIPs for each site switch, and at a block 510, updates the address 207.95.55.23 (to indicate that this address is a VIP) in the VIP list maintained for the site switch 208.

A client makes a query to the GSLB switch 200 requesting access to dub-dub-dub dot gslb dotcom at a block 512, with the IP addresses configured on the authoritative DNS server 202 for the domain dub-dub-dub dot gslb dotcom being 207.95.55.23 and 253.72.96.55. The GSLB switch 200 forwards the request to the DNS server 202 at a block 511, and the DNS server 202 sends an address list associated with the domain to the GSLB switch at a block 515 (i.e., the addresses 207.95.55.23 and 253.72.96.55 in this example). The GSLB site switch 200 refers to the address records 212 at a block 513 and can now correctly identify that 207.95.55.23 is a VIP on the site switch 208, since the GSLB switch 200 now has this IP address in the VIP list maintained for the site switch 208. The GSLB site switch 200 then performs GSLB on these IP address using the applicable metrics and selects the best IP address from among the addresses 207.95.55.23 and 253.72.96.55 at a block 514. Information reported by the site switch 208 can be used by the GSLB switch 200 for the VIP 207.95.55.23 during this selection process at the block 514, since the IP address 207.95.55.23 has been correctly identified as a VIP on the site switch 208. The final operation in the flowchart is the transmission of the ordered address list to the inquiring client at a block 516.

In the load balancing arrangement depicted in FIG. 3, both remote and local load balancing are performed, except that the arrangement is configured "for peer only," where public IP addresses are communicated only to a remote peer GSLB switch 300 from a site switch 308, which performs its own ("self") local GSLB but does not communicate public IP addresses to its own internal GSLB components.

To further elaborate, the site switch 308 performs GSLB for one or more associated local sites 312 and remote sites (if any), and in addition is the site switch for the GSLB switch 300 that load balances traffic to a site 314 having host servers 310 coupled to the site switch 308. The site switch 308 is configured with the private VIP addresses to which the servers 310 of the site 314 are bound and obtains at 324 mapping information from a mapping device 306, which maps these private VIP addresses to public IP addresses. The public IP addresses are obtained from the mapping device 306 using techniques previously described above, and as before with reference to FIGS. 2 and 5, the public IP addresses are communicated (along with related metrics information) by the site switch 308 to the GSLB switch 300 via a protocol message communication 316, so that the GSLB switch 300 can update its VIP list with the public IP address of the VIP.

The site switch 308 is also configured with the private IP addresses associated with the local site 312. However, since the site switch 308 is configured "for peer only," the site switch 308 does not send any public IP addresses associated with the local site 312 to the internal GSLB components 318 (e.g., a local GSLB controller or metric collector) integrated within the site switch 308. Rather, the site switch 308 sends the private VIP addresses configured on it to the internal GSLB components 318.

Figure 6:
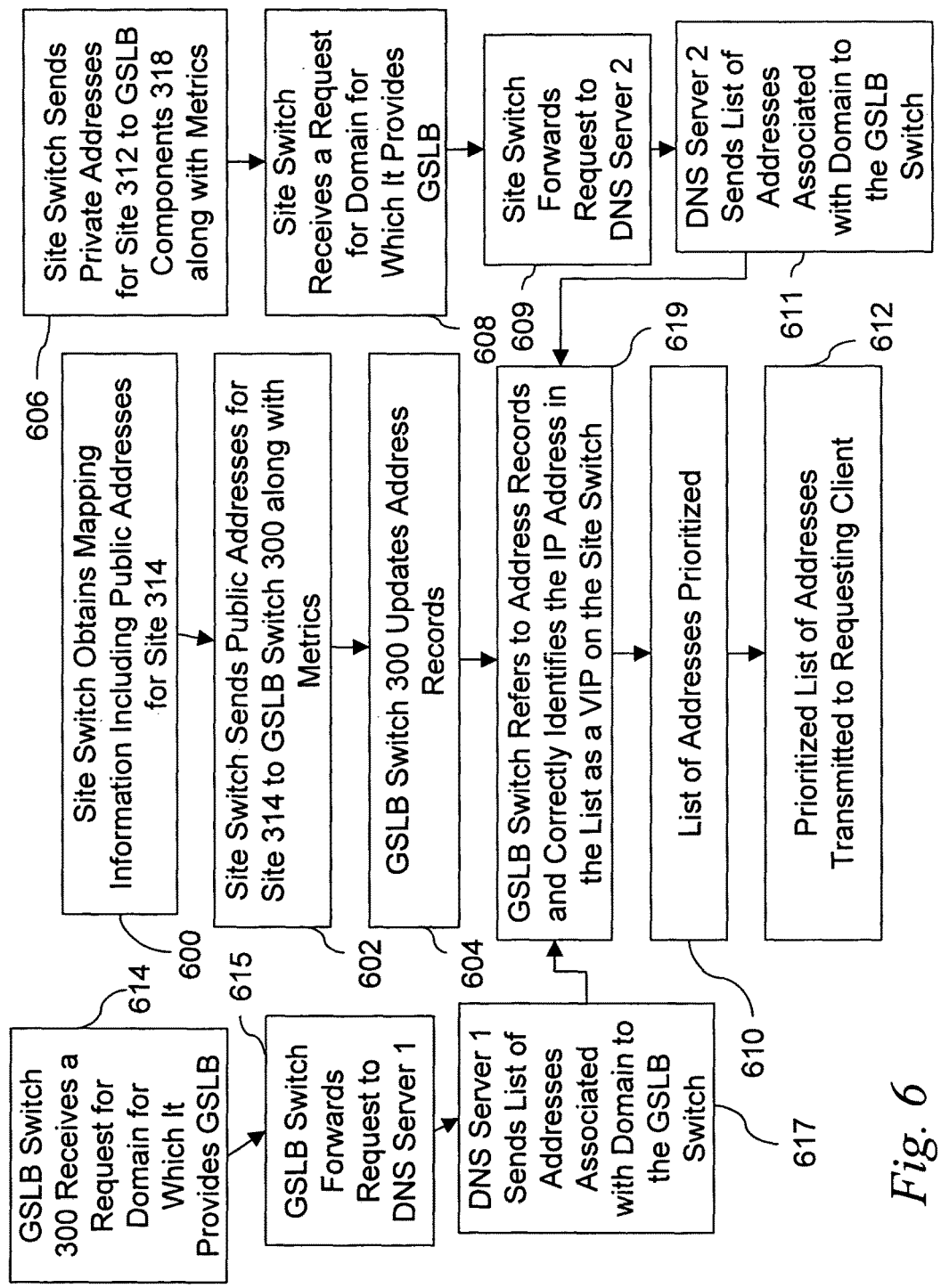
FIG. 6 is a flowchart of a GSLB process to provide public addresses for only remote load balancing in an arrangement having both remote and local load balancing according to an embodiment of the invention.

An example description of the operation of the arrangement of FIG. 3 will now be provided in conjunction with a flowchart of FIG. 6. The GSLB switch 300 provides GSLB for a domain dub-dub-dub dot gslb1 dotcom. The public IP addresses configured for dub-dub-dub dot gslb1 dotcom on an authoritative DNS server 302 are 207.95.55.23 and 253.72.96.55. As explained above, the GSLB switch 300 does not have any local site configured, and has one remote site 314 with the site switch 308 (e.g., the site switch 308 is a site switch for the GSLB switch 300).

In addition to being a site switch for the GSLB switch 300, the site switch 308 itself is also a GSLB switch that provides GSLB for a domain dub-dub-dub dot foo dotcom at the local site 312. The IP addresses configured for the domain dub-dub-dub dot foo dotcom on an authoritative DNS server 322 are 192.168.10.1 and 192.168.72.1, which are private IP addresses. Accordingly, the site switch 308 provides GSLB for the domain dub-dub-dub dot foo dotcom and is the local site switch used by its internal GSLB components 318. In addition, the site switch 308 operates as the remote site switch for the GSLB switch 300, which provides GSLB for the domain dub-dub-dub dot gslb1 dotcom.

When the "for peer only" configuration is completed on the site switch 308, the site switch 308 will do the following:

1) Since the site switch 308 is a remote site switch for the GSLB switch 300, the site switch 308 will communicate the VIPs configured on it via the message communication 316 to the GSLB switch 300. In particular, the site switch 308 obtains the mapping information including the public IP addresses for the site 314 from the mapping device 306 at a block 600, and will notify the GSLB switch 300 that the site switch 308 has a VIP 207.95.55.23 configured on it at a block 602. The GSLB switch 300 maintains address records 320 of VIPs for each site switch and at a block 604, updates the VIP address as 207.95.55.23 in the VIP records maintained for the site switch 308.

2) In addition, the site switch 308 is also a local site for the site switch 308 operating as a GSLB switch. Therefore, the site switch 308 will communicate the VIPs configured on it to its internal GSLB components 318 (along with metrics information) at a block 606. However, since the user has configured the "for peer only" option for one of the private VIP addresses (say 192.168.10.1, for instance), the local site switch 308 will notify its internal GSLB components 318 that it has a private VIP 192.168.10.1 configured on it--note that it does not communicate the public IP address of the VIP to the internal GSLB components 318.

A client makes a query for dub-dub-dub dot foo dotcom, which the site switch 308 receives as a request to access the site 312 at a block 608, and forwards the request to the DNS server 322 at a block 609. The IP addresses configured for the domain dub-dub-dub dot foo dotcom on the DNS server 322 are 192.168.10.1 and 192.168.72.1. The DNS server 322 sends the list of addresses containing 192.168.10.1 and 192.168.72.1 to the internal GSLB components 318. The internal GSLB components 318 refer to its address records 326 at a block 619 and correctly identify that 192.168.10.1 is a VIP configured on the local site switch 308, since the internal GSLB components 318 has this IP address in the VIP list it maintained for the site switch 312. The internal GSLB components 318 then perform GSLB on these IP addresses using the appropriate metrics and selects the best IP address for the client at a block 610. Metric information reported by the site switch 308 can be used by the internal GSLB components 318 for the VIP 192.168.10.1 during the selection process at the block 610. The prioritized list of addresses is sent to the requesting client at a block 612.

If a client makes a query for dub-dub-dub dot gslb1 dotcom to the GSLB switch 300 to request access to the site 314 at a block 614, the IP addresses configured for the domain dub-dub-dub dot gslb dotcom on the DNS server 302 are 207.95.55.23 and 253.72.96.55. The GSLB switch 300 sends this request to the DNS server 302 at a block 615, and receives a list of addresses containing the addresses 207.95.55.23 and 253.72.96.55 from the DNS server 302 at a block 617. The GSLB switch 300 refers to its address records 320 at the block 619, and correctly identifies that 207.95.55.23 is a VIP on the site switch 308, since the GSLB switch 300 has this IP address in the VIP list maintained for the site switch 308. The GSLB switch 300 then performs GSLB on these IP addresses using the appropriate metrics and selects the best IP address for the client at the block 610. Information reported by the site switch 308 can be used by the GSLB switch 300 for the VIP 207.95.55.23 during the selection process at the block 610, since the IP address 207.95.55.23 has been correctly identified as a VIP on the site switch 308.

Under another remote and local combination load balancing aspect of an embodiment of the invention shown in FIG. 4, the site switch 308 can be configured "for self and peer," wherein public IP address are provided by the site switch 308 to both the peer GSLB switch 300 and the internal GSLB components 318 integrated within the site switch 308. As with the embodiment of FIG. 3, the remote GSLB switch 300 receives metric information regarding servers 310 from the local site switch 308 and performs the load balancing for the site 314. The local site switch 308 also acts as an independent GSLB switch for the local site 312 and handles its load balancing based on the public IP addresses and metrics information received by its internal GSLB components 318 from other internal components 400 of the site switch 308. A requesting client would query the remote GSLB switch 300 for addresses of domains it is providing GSLB for. Similarly, the requesting client would query the GSLB controller at the site switch 308 for addresses for domains the site switch 308 is providing GSLB for.

Figure 7:
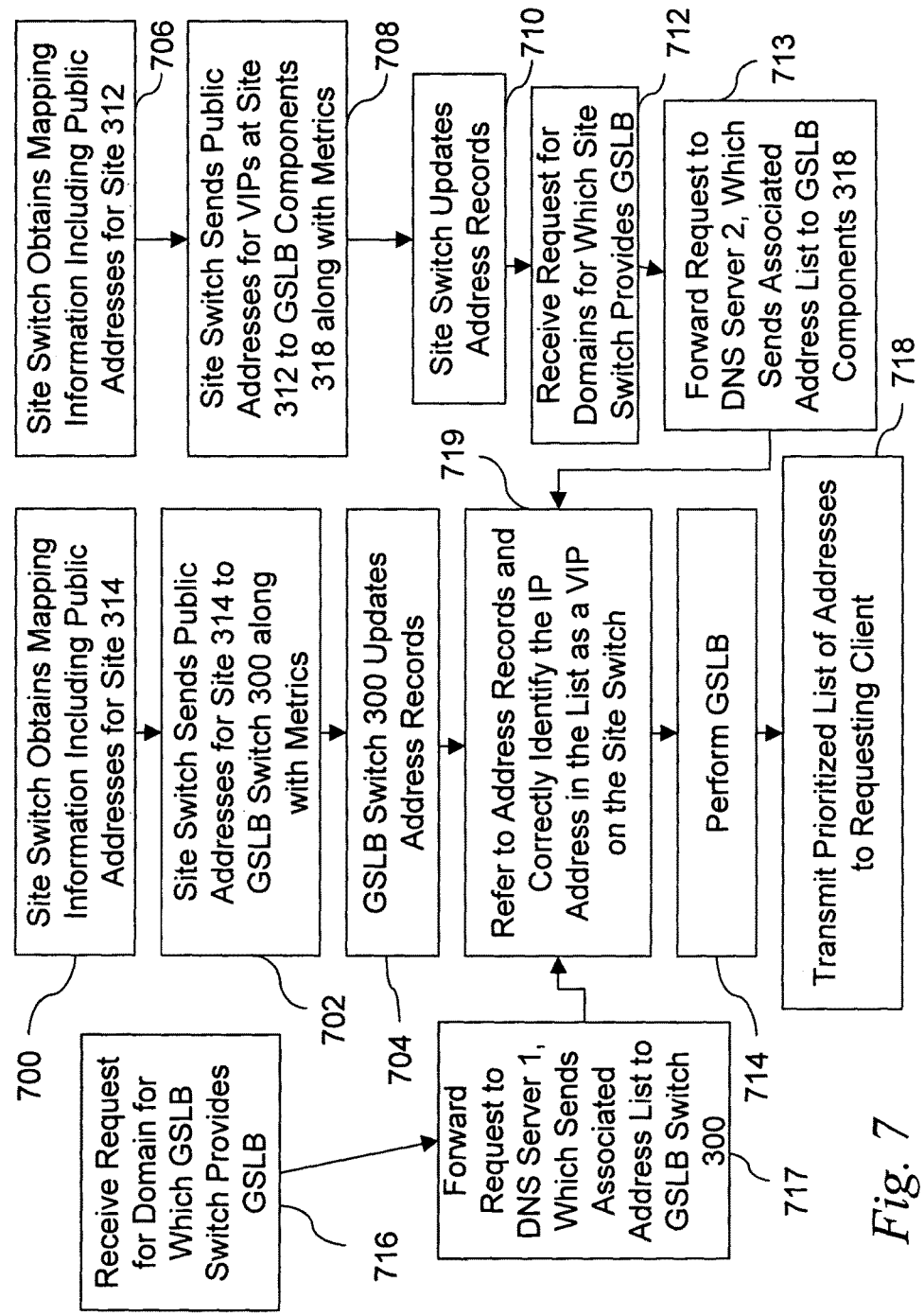
FIG. 7 is a flowchart of a GSLB process to provide public addresses for both remote and local load balancing according to an embodiment of the invention.

Another example is now provided to illustrate operation of the arrangement of FIG. 4 in connection with the "for self and peer" configuration, which is also to be described in connection with the flowchart of FIG. 7. The GSLB switch 300 provides GSLB for the domain dub-dub-dub dot gslb1 dotcom. The public IP addresses configured for dub-dub-dub dot gslb1 dotcom on the DNS server 302 are 207.95.55.23 and 253.72.96.55. The GSLB switch 300 does not have any local site configured, and uses the site switch 308 as its remote site switch.

Additionally, the site switch 308 is also a GSLB switch providing GSLB for the domain dub-dub-dub dot foo dotcom, with the site switch 308 itself functioning as the site switch for its internal GSLB components 318. The public IP addresses configured for the domain dub-dub-dub dot foo dotcom on the DNS server 322 are 207.95.55.23 and 245.20.72.1, with the private IP address 192.168.10.1 being mapped to the public IP address 207.95.55.23.

When the "for self and peer" configuration is performed on the site switch 308, the site switch 308 will perform the following:

1) Since the site switch 308 is a remote site switch for the GSLB switch 300, the site switch 308 will communicate the VIPs configured on the site switch 308 via the message communication 316 to the GSLB switch 300. In particular, the site switch 308 obtains (at 324 in FIG. 4) the mapping information including the public IP addresses for the site 314 from the mapping device 306 at a block 700, and will notify the GSLB switch 300 that the site switch 308 has a VIP 207.95.55.23 configured on it at a block 702. The site switch 308 also sends metrics information to the GSLB switch 300. The GSLB switch 300 maintains address records 320 of VIPs for each site switch, and at a block 704, updates the VIP address as 207.95.55.23 in the VIP records maintained for the site switch 308.

2) In addition, site switch 308 is also a local site for the internal GSLB components 318. Therefore, components 400 will obtain mapping information between private and public IP addresses associated with the site 312 at a block 706 and will communicate the VIPs configured on the site switch 308 to the internal GSLB components 318 at a block 708. Since user has configured the "for self and peer" option for the VIP 192.168.10.1, the internal components 400 will notify the internal GSLB components 318 that the VIP 207.95.55.23 is configured on the site switch 308 at the block 708—note that the public IP address of the VIP is communicated to the internal GSLB components 318. If necessary, address records 326 are updated by the internal GSLB components 318 to indicate that the public IP address 207.95.55.23 corresponds to a VIP on the site switch 308.

The IP addresses configured for the domain dub-dub-dub dot foo dotcom on the DNS server 322 are 207.95.55.23 and 245.20.72.1. If a client makes a query to the site switch 308 at a block 712 for the domain dub-dub-dub dot foo dotcom, the site switch 308 forwards the request to the DNS server 322 at a block 713, and receives a list of addresses containing 207.95.55.23 and 245.20.72.1. The internal GSLB components 318 refers to the address records 326 at a block 719, and correctly identify that 207.95.55.23 is a VIP on the local site switch 308, since this public IP address is now kept in the VIP list (e.g., the address records 326) maintained for the site switch 308. The internal GSLB components 318 then perform GSLB on these IP addresses using the appropriate metrics and selects the best IP address for the client at a block 714. Metric information reported by the site switch 308, or more particularly by the components 400, can be used by the internal GSLB components 318 for the VIP 207.95.55.23 during the selection process at the block 714.

The IP addresses configured for the domain dub-dub-dub dot gslb1 dotcom on the DNS server 302 are 207.95.55.23 and 253.72.96.55. If a client makes a query to the GSLB switch 300 for the domain dub-dub-dub dot gslb1 dotcom at a block 716, the GSLB switch 300 forwards the request to the DNS server 302 at a block 717, and receives a list of addresses containing 207.95.55.23 and 253.72.96.55. The GSLB switch 300 refers to the address records 320 at the block 719, and correctly identifies that 207.95.55.23 is a VIP on the site switch 318, since this IP address in the VIP list (e.g., the address records 320) maintained for the site switch 308. The GSLB switch 300 then performs GSLB on these IP addresses using the appropriate metrics and selects the best IP address for the client at the block 714. Information reported by the site switch 308 can be used by the GSLB switch 300 for the VIP 207.95.55.23 during the selection process at the block 714, since the IP address 207.95.55.23 has been correctly identified as a VIP on the site switch 308. The prioritized list of addresses is sent to the requesting client at a block 718.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of providing load balancing comprising:
   receiving, at a first network device to load balance, the first network device serving as a proxy to a domain name server, from a second network device that performs network switching for a site coupling at least one host server to a network, mapping information that provides a translation between a private virtual IP address, configured at the second network device and associated with at least one host server corresponding to the second network device, and a public virtual IP address associated with the second network device; and
   applying, by the first network device, a load balancing algorithm associated with the public virtual IP address, wherein the load balancing algorithm comprises applying a metric associated with the private virtual IP address.

2. The method of claim 1, wherein the first network device is located at a global load balance switch.

3. The method of claim 1, further comprising:
   receiving the public virtual IP address from the domain name server as part of reply to a query for network addresses;
   determining, by looking up the public virtual IP address in a table known to the first network device that the public virtual IP address is associated with a corresponding network device that performs network switching for a site and that the address is a virtual IP address; and
   applying a metric of the load balancing algorithm that is usable only with virtual IP addresses.

4. The method of claim 1, wherein the public virtual IP address enables the first network device to apply at least one metric of the load balancing algorithm to the public virtual IP address, and the at least one metric comprises an active bindings metric that identifies a virtual IP address configured at a corresponding network device that performs network switching for a site having a maximum number of active host servers bound to a preferred virtual IP address.

5. The method of claim 1, wherein receiving mapping information comprises receiving mapping information, at a network device to load balance, from a mapping device comprising a network address translation device or a firewall device.

6. The method of claim 1, wherein the mapping information is stored at the second network device.

7. A network device to load balance comprising:
   a storage medium comprising instructions stored thereon that are executable by the network device to load balance to enable the network device to load balance to:
   receive, from a site switch coupling at least one host server to a network, mapping information that provides a translation between a private virtual IP address, configured at the site switch and associated with at least one host server corresponding to the site switch, and a public virtual IP address associated with the site switch; and
   apply a load balancing algorithm associated with the public virtual IP address, wherein the load balancing algorithm comprises applying a metric associated with the private virtual IP address.

8. The network device to load balance of claim 7, wherein the network device to load balance is located at a load balancing switch.

9. The network device to load balance of claim 7, wherein the instructions are executable by the network device to load balance to further enable the network device to load balance to:
   receive the public virtual IP address from the domain name server as part of reply to a query for network addresses;
   determine, by looking up the public virtual IP address in a table known to the network device to load balance that the public virtual IP address is associated with a corresponding site switch and that the address is a virtual IP address; and
   apply a metric of the load balancing algorithm that is usable with virtual IP addresses.

10. The network device to load balance of claim 7, wherein the public virtual IP address enables the network device to load balance to apply at least one metric of the load balancing algorithm to the public virtual IP address, and the at least one metric comprises an active bindings metric that identifies a virtual IP address configured at a corresponding site switch having a maximum number of active host servers bound to a preferred virtual IP address.

11. The network device to load balance of claim 7, wherein the mapping information is received at a network device to load balance from a mapping device comprising a network address translation device or a firewall device.

12. The network device to load balance of claim 7, wherein the mapping information is stored at the at least one site switch.

13. A network device comprising a controller to load balance, configured to:
   receive, from a site switch communicatively coupling at least one host server to a network, mapping information that provides a translation between a private virtual IP address, configured at the site switch and associated with at least one host server corresponding to the site switch, and a public virtual IP address associated with the site switch; and
   apply a load balancing algorithm associated with the public virtual IP address, wherein the load balancing algorithm comprises applying a metric associated with the private virtual IP address.

14. The network device of claim 13, wherein the network device further comprises a load balancing switch.

15. The network device of claim 13, wherein the network device is further configured to:
- receive the public virtual IP address from a domain name server as part of reply to a query for network addresses;
- determine, by looking up the public virtual IP address in a table known to the controller to load balance that the public virtual IP address is associated with a corresponding site switch and that the address is a virtual IP address; and
- apply a metric of the load balancing algorithm that is usable with virtual IP addresses.

16. The network device of claim 13, wherein the public virtual IP address enables the controller to load balance to apply at least one metric of the load balancing algorithm to the public virtual IP address, and the at least one metric comprises an active bindings metric that identifies a virtual IP address configured at a corresponding site switch having a maximum number of active host servers bound to a preferred virtual IP address.

17. The network device of claim 13, wherein the mapping information is received at a controller to load balance from a mapping device, the mapping device comprising one of a network address translation device or a firewall device.

18. The network device of claim 13, wherein the mapping information is stored at the at least one site switch.

* * * * *